May 5, 1953 H. W. HESTER 2,637,247
GAS OPERATED SELF-EJECTING AND SELF-LOADING FIREARM
Filed May 12, 1948 13 Sheets-Sheet 12
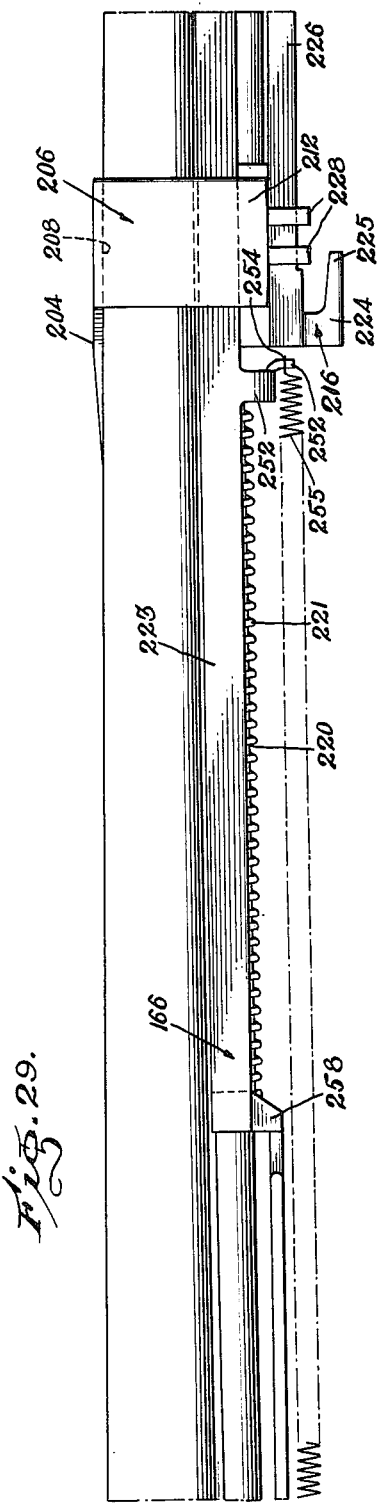
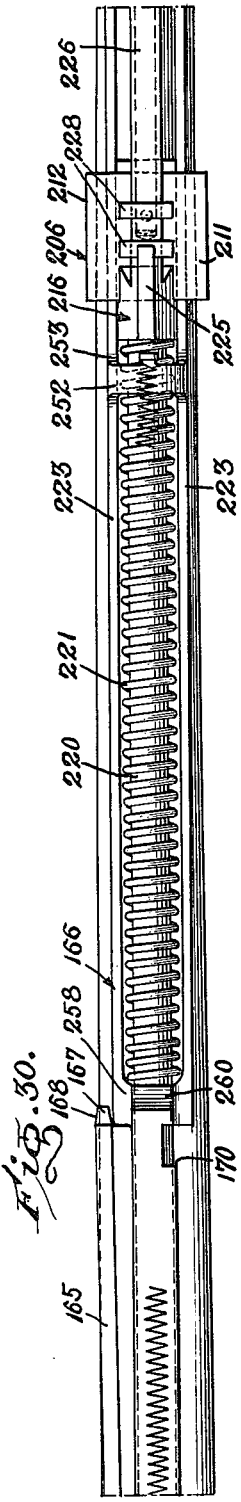
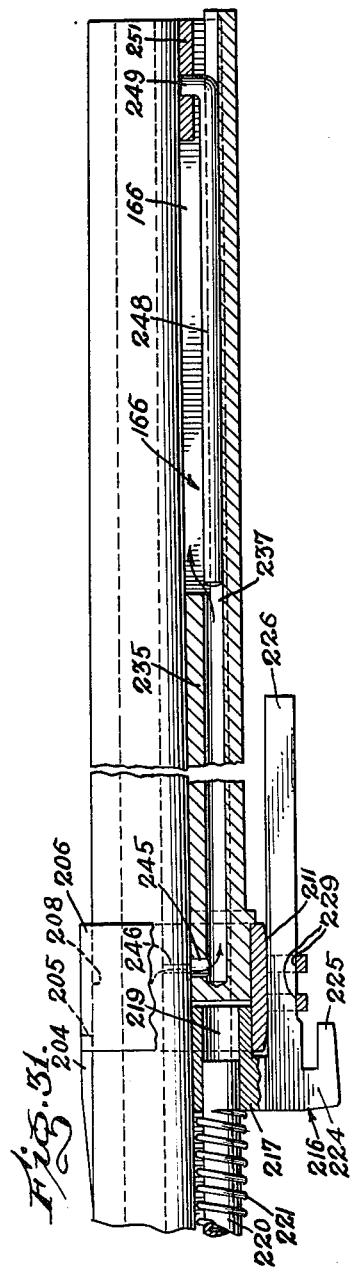
Inventor
Harry W. Hester
BY
R. H. Wendt
Attorney

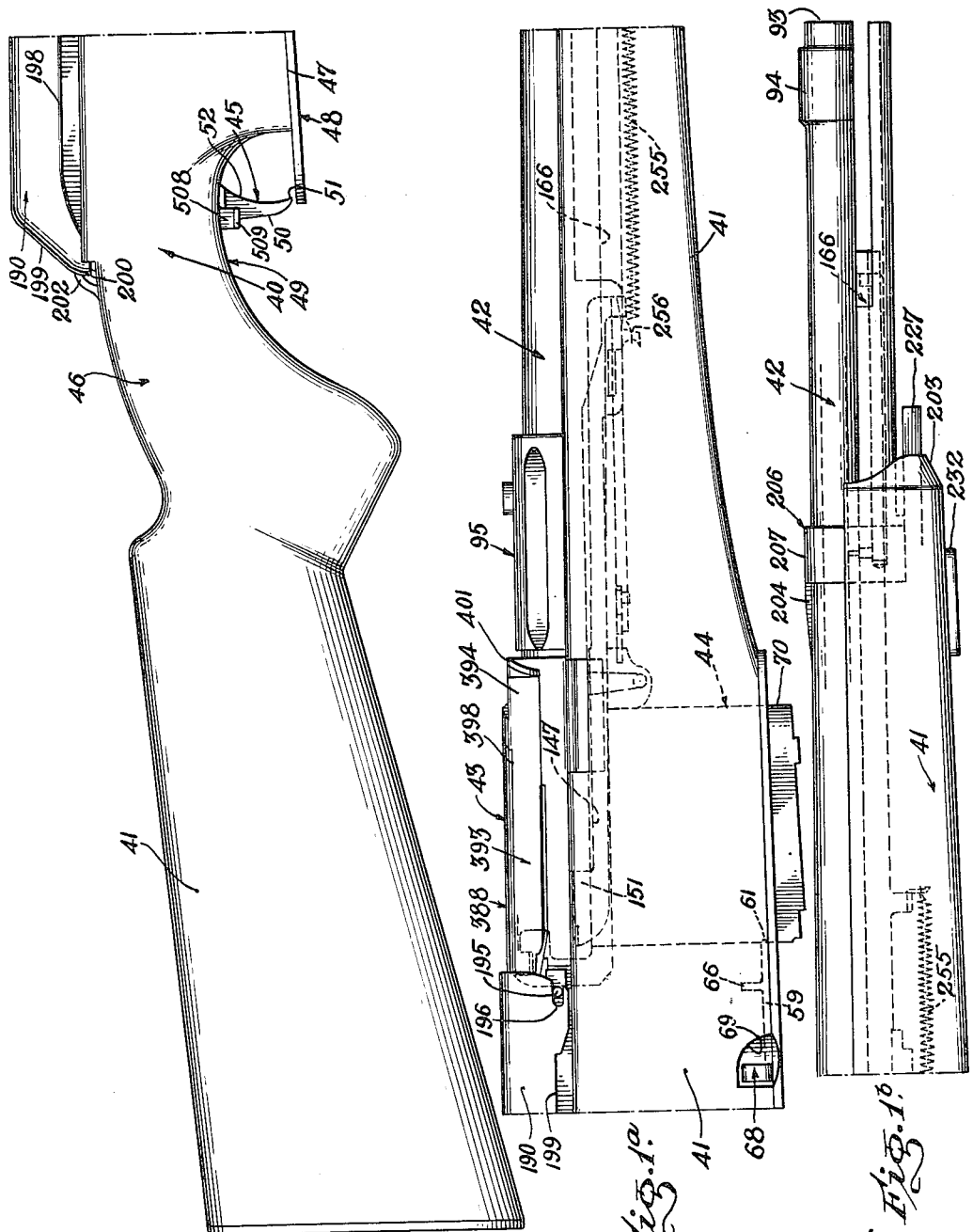

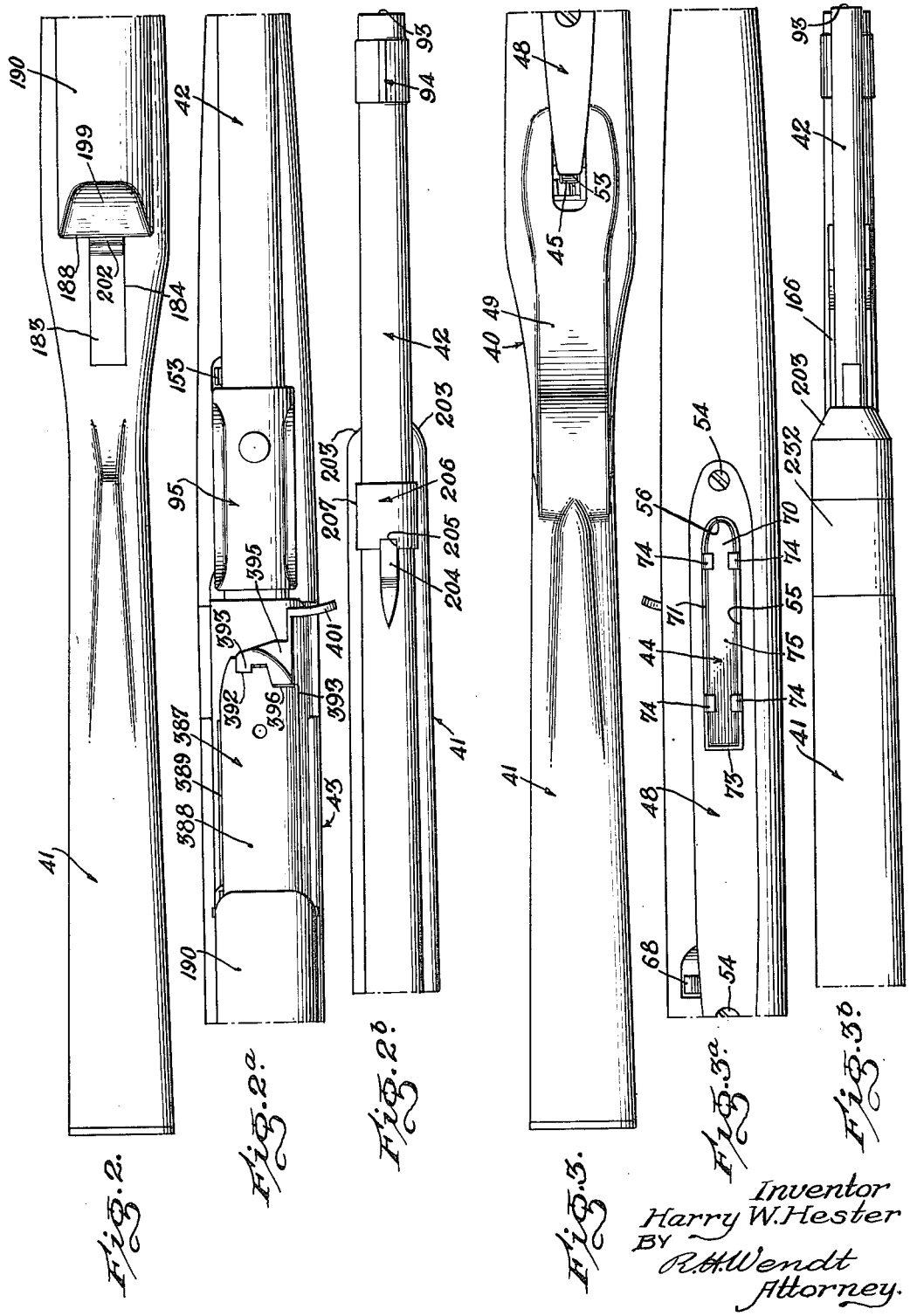

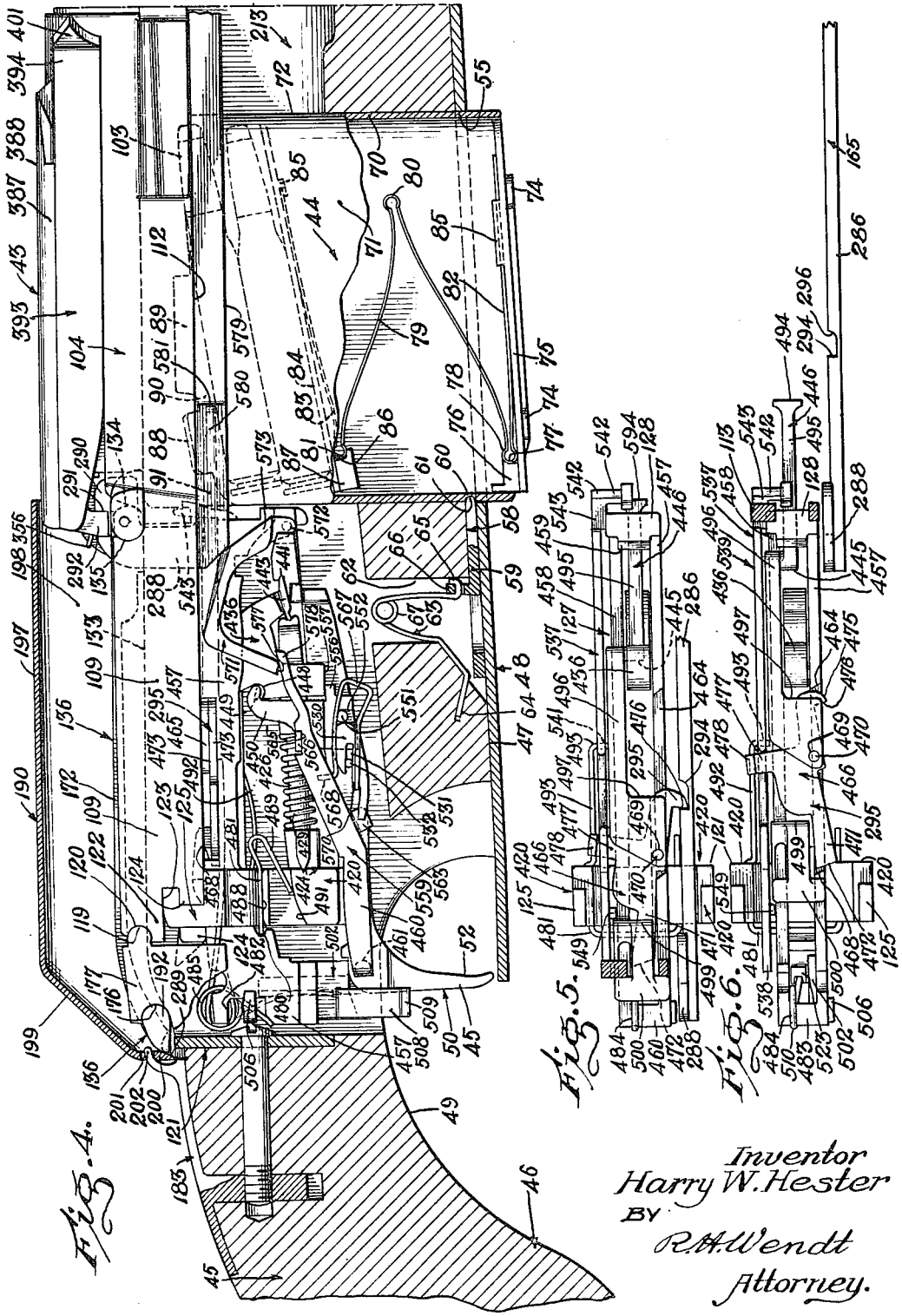

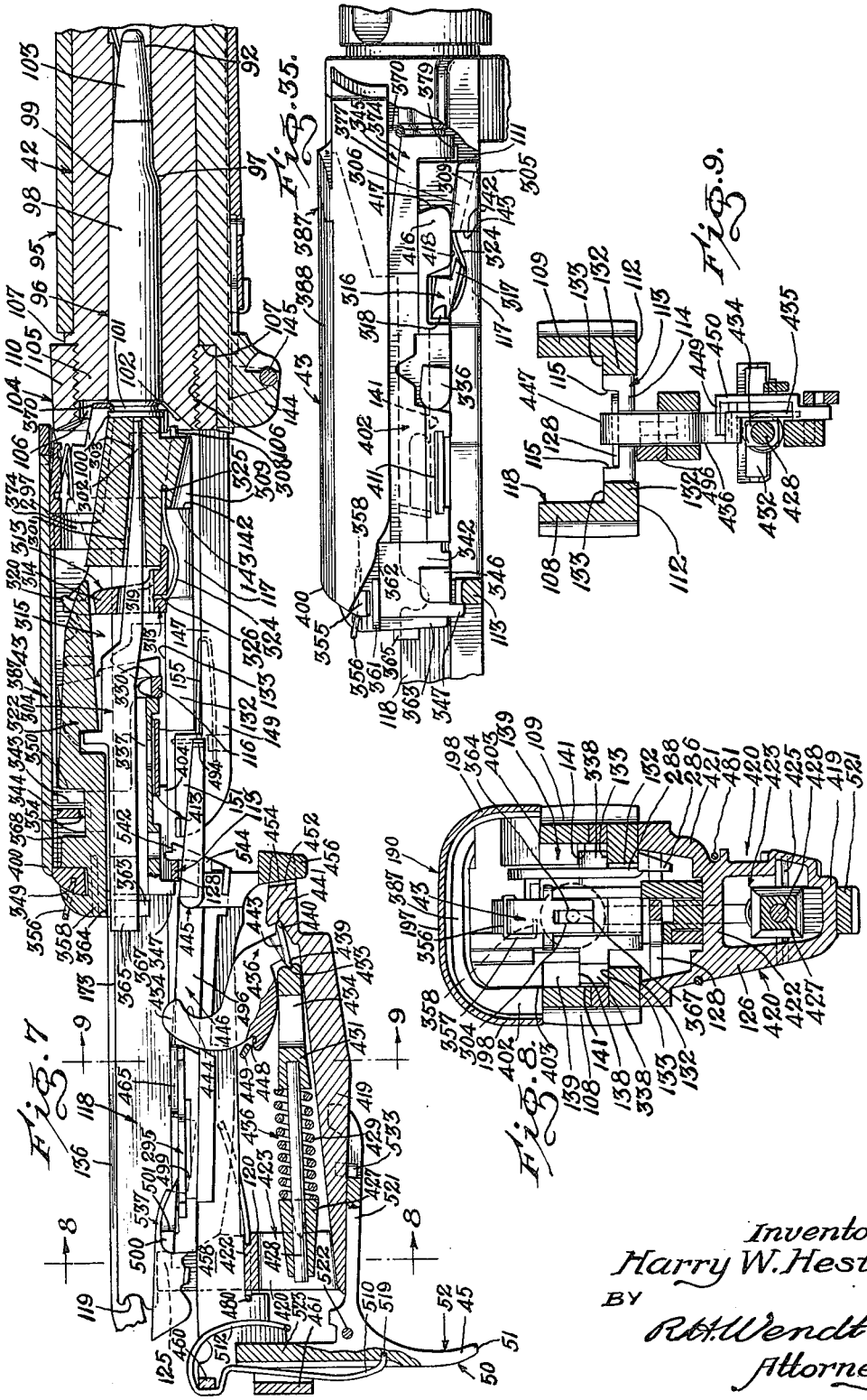

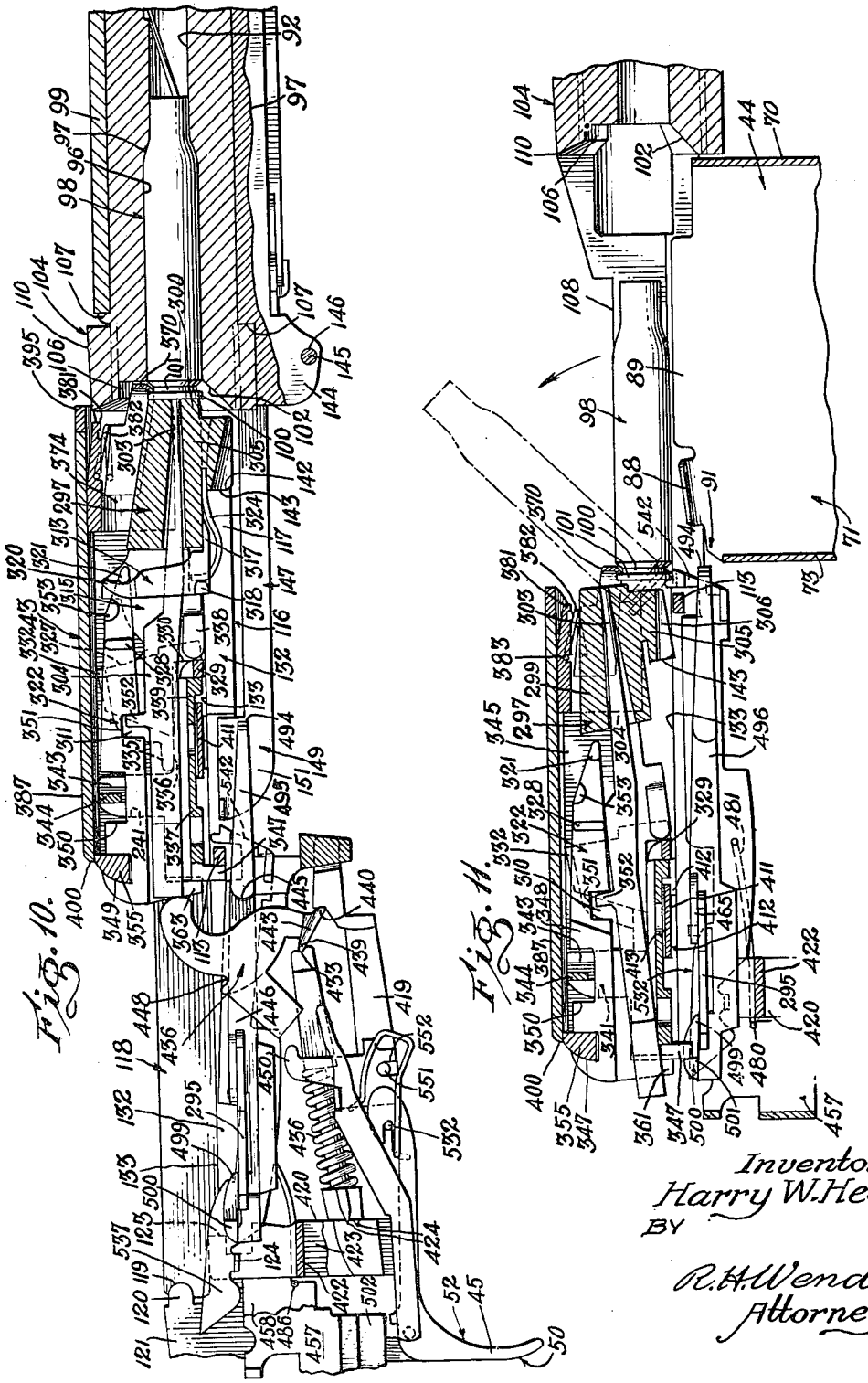

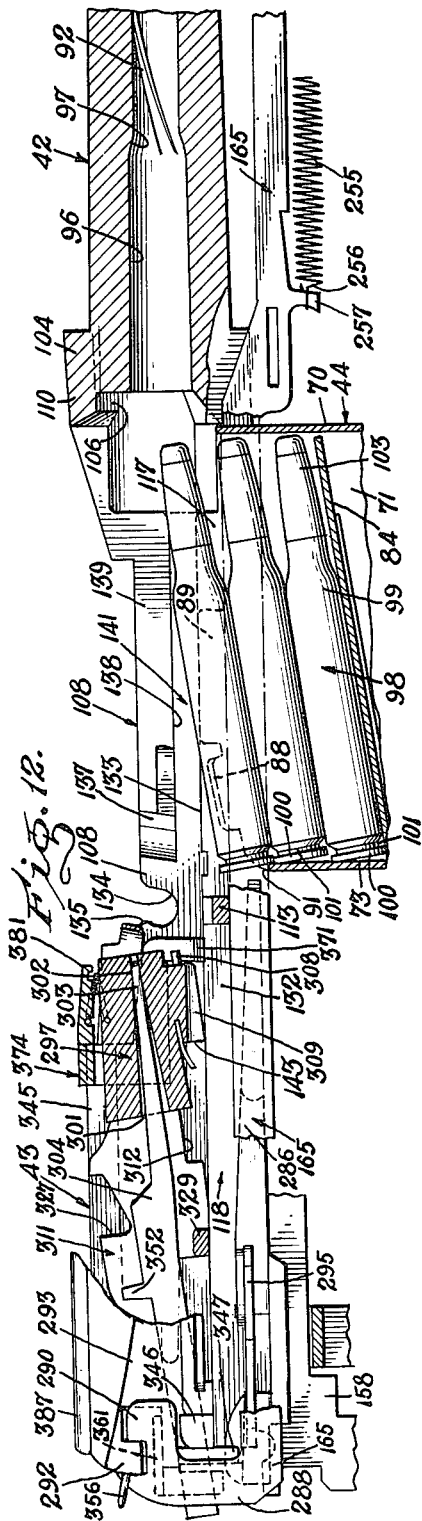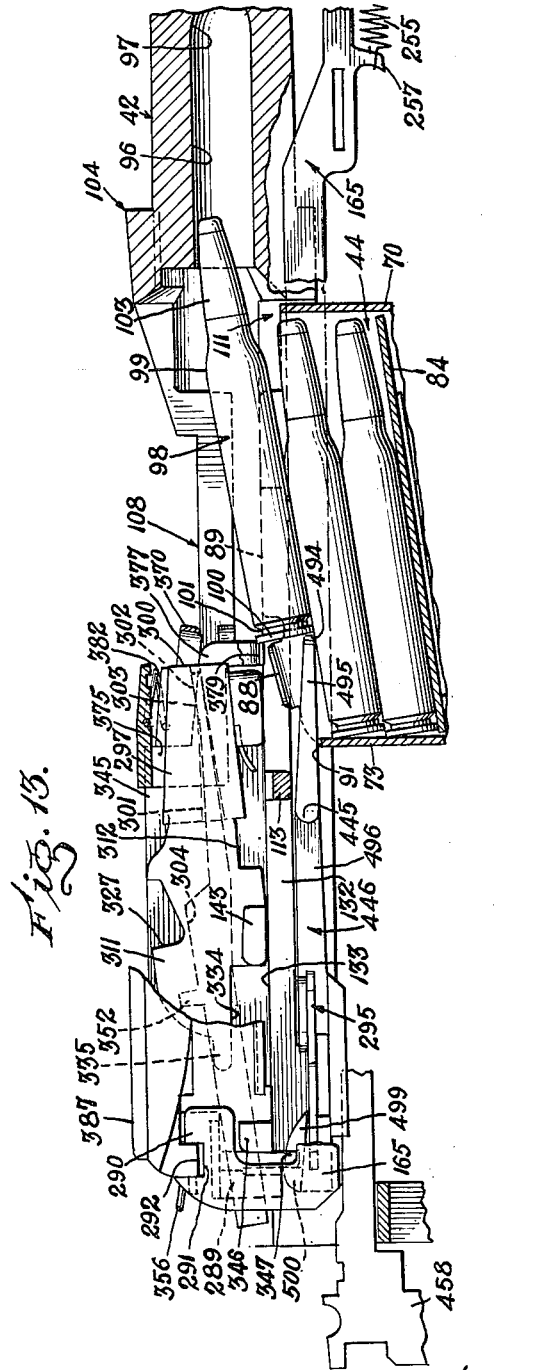

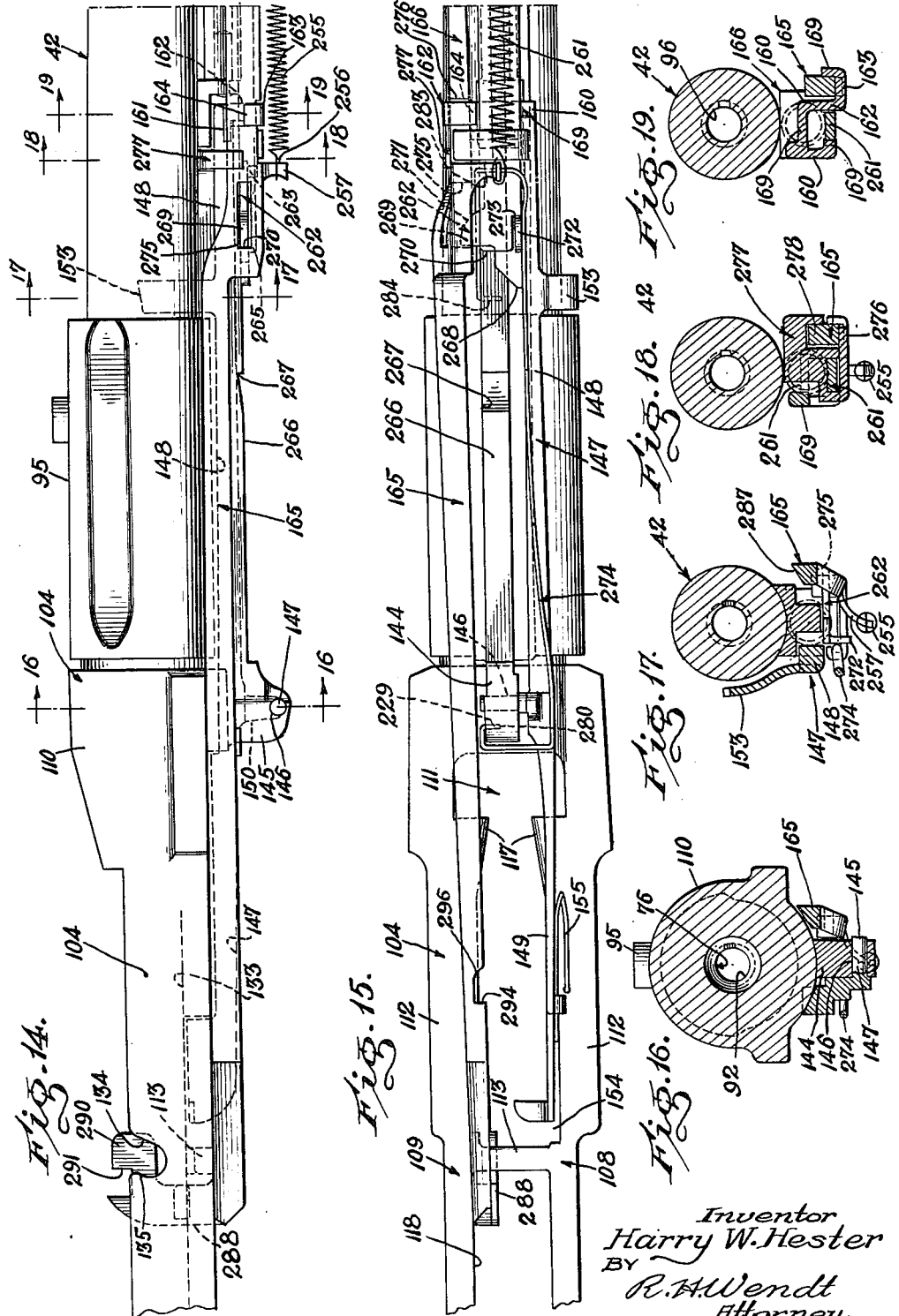

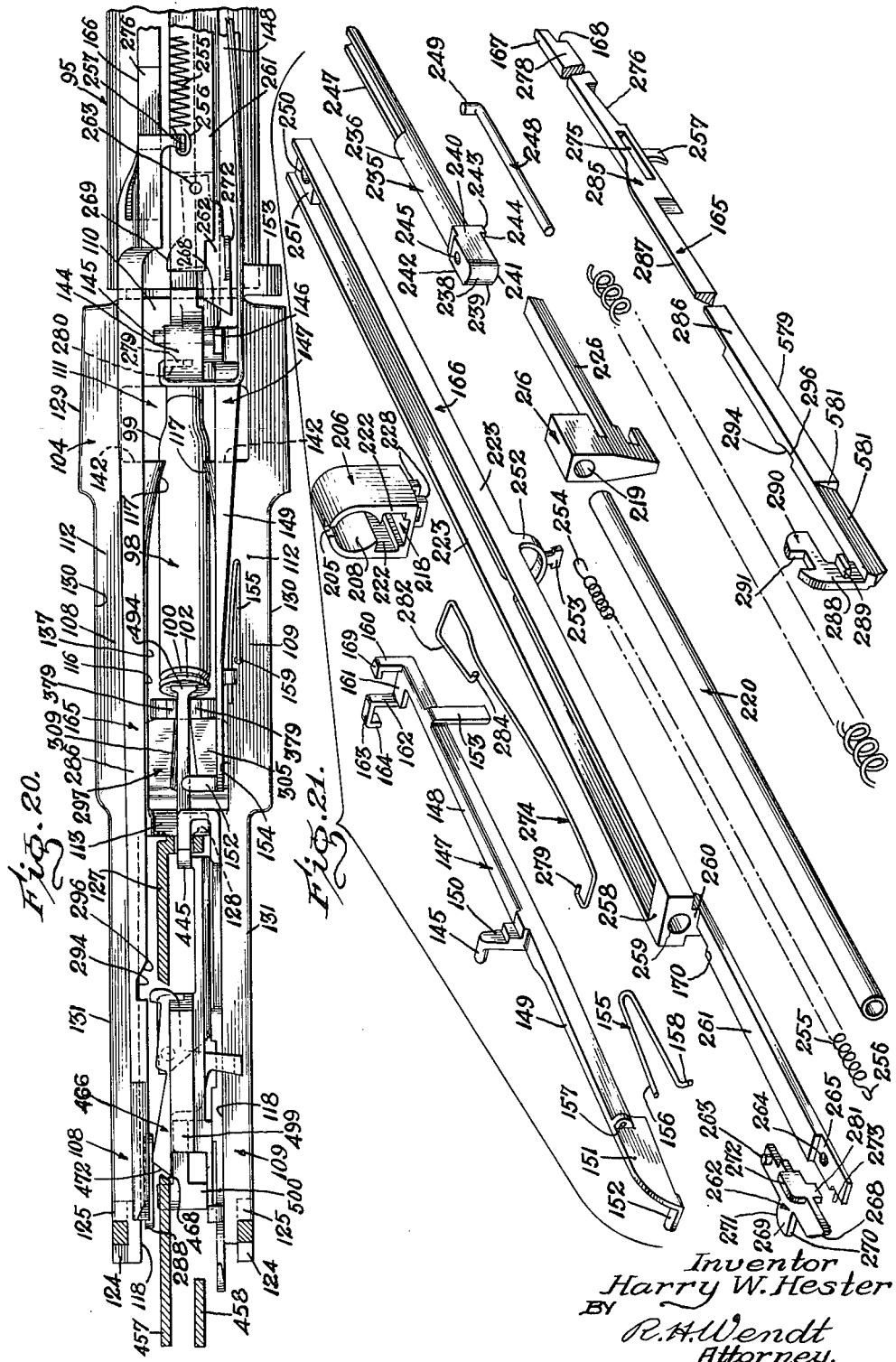

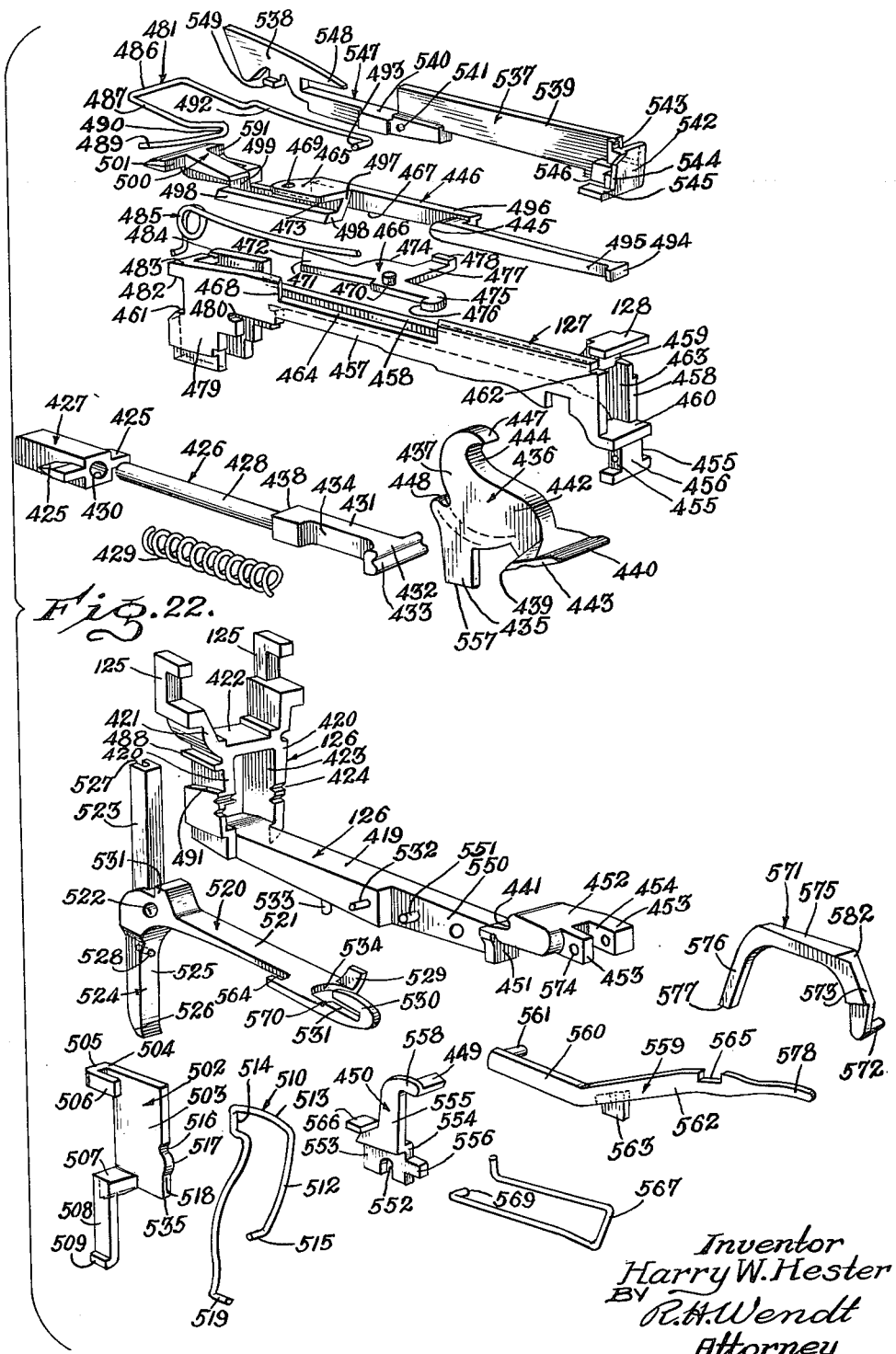

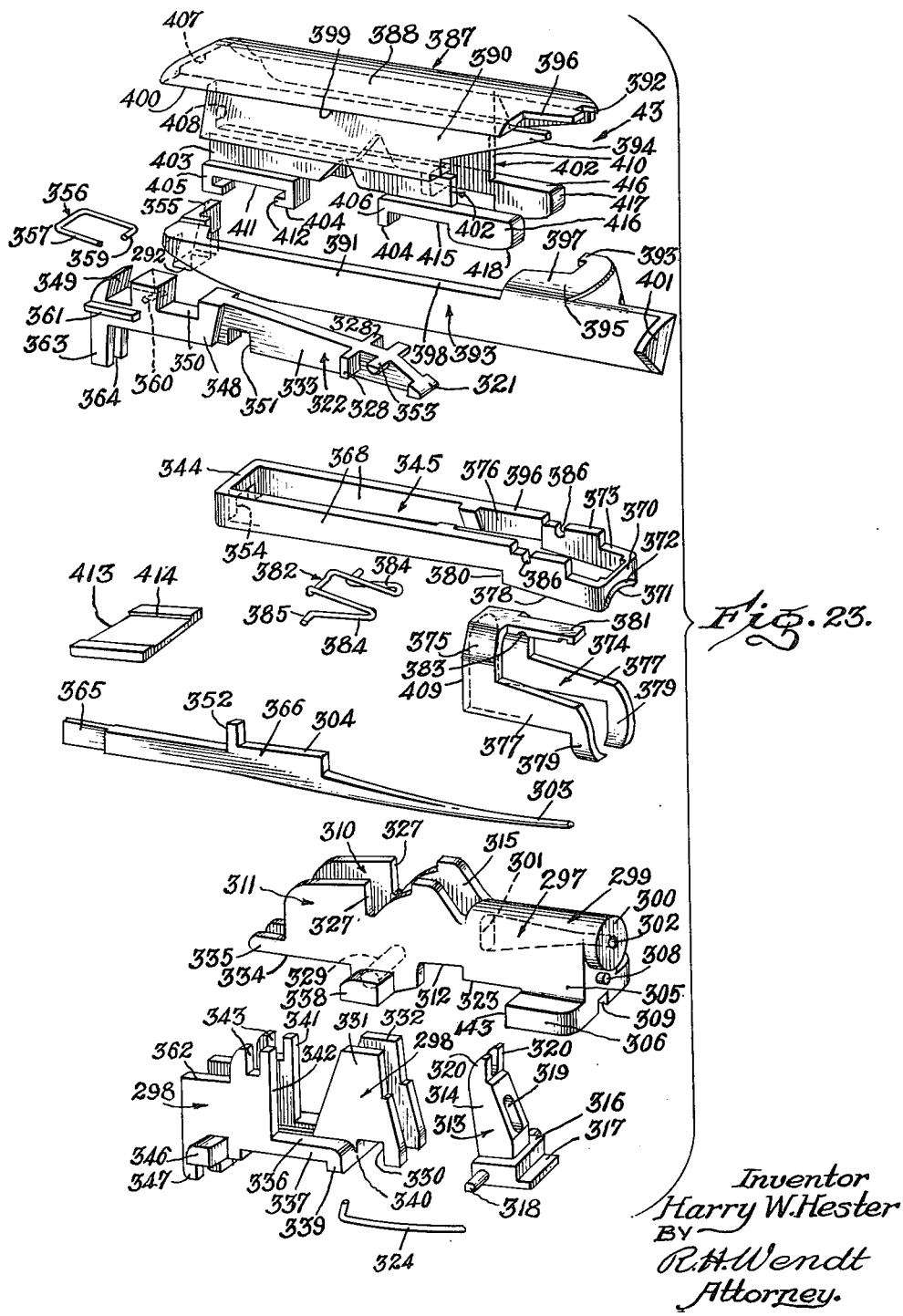

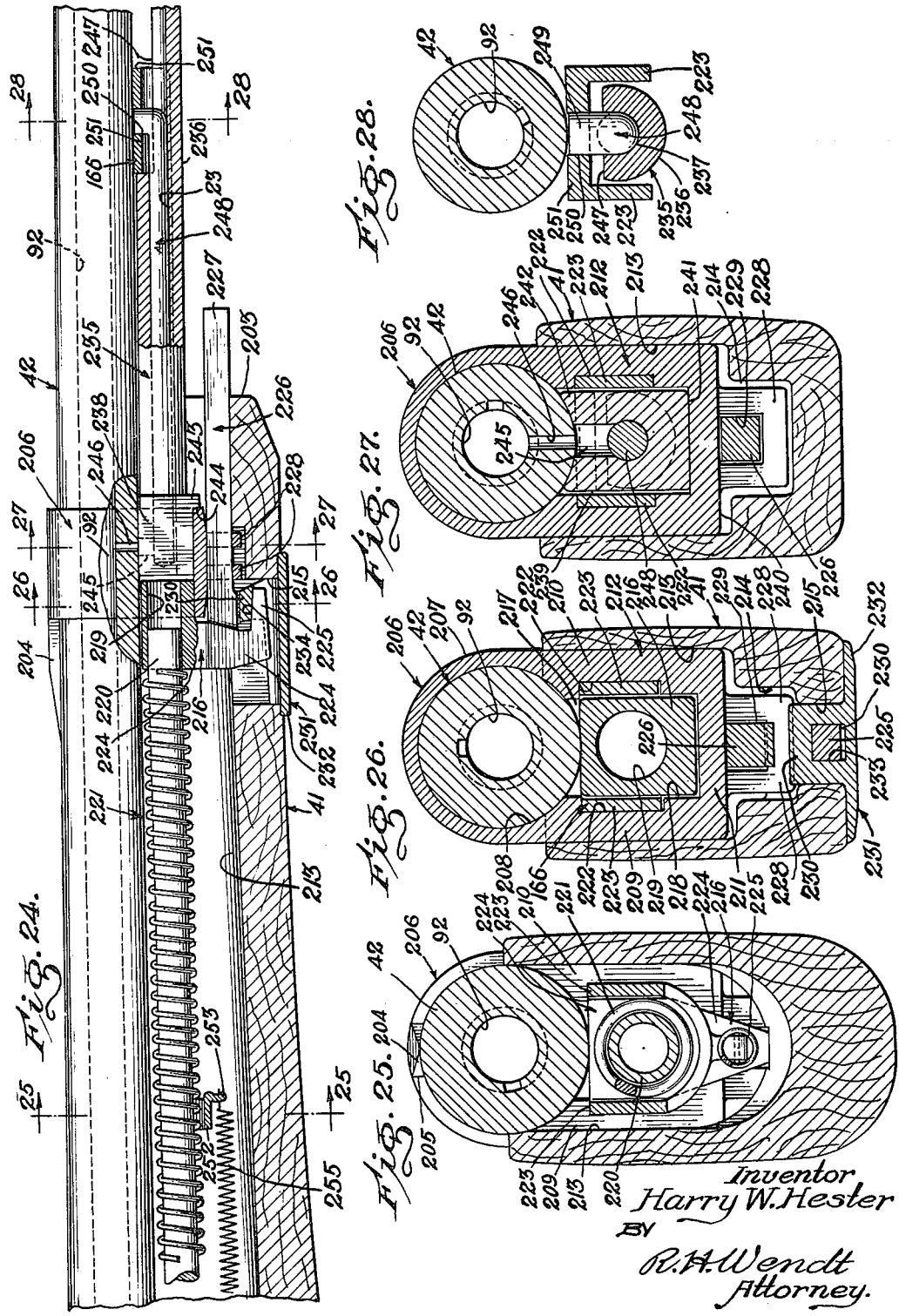

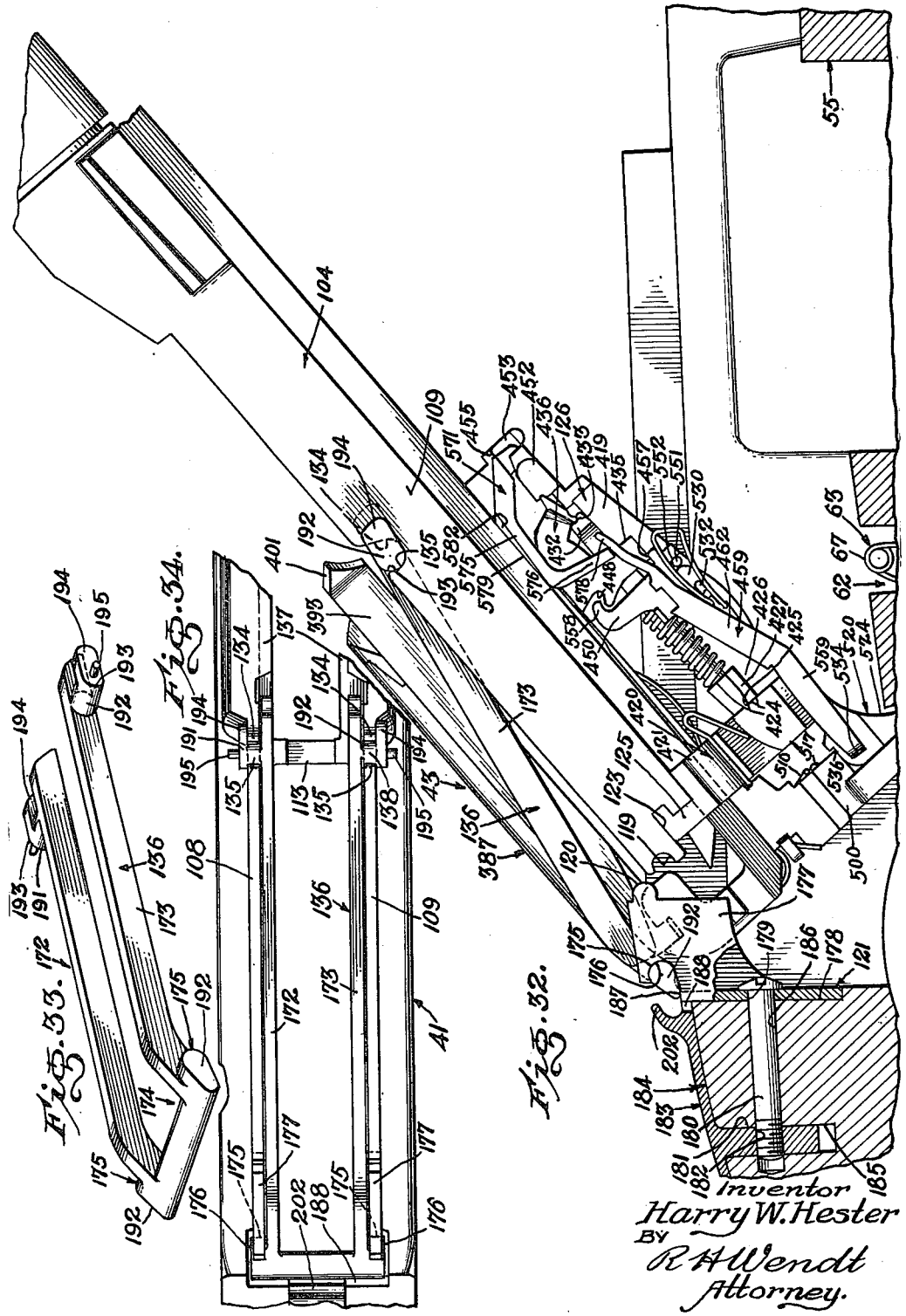

Patented May 5, 1953

2,637,247

UNITED STATES PATENT OFFICE 2,637,247

GAS-OPERATED SELF-EJECTING AND SELF-LOADING FIREARM

Harry W. Hester, Chenoa, Ill., assignor of one-third to Glen C. Simpson, St. Charles, and one-third to Robert H. Wendt, Chicago, Ill.

Application May 12, 1948, Serial No. 26,623

18 Claims. (Cl. 89—192)

The present invention relates to self-ejecting and self-loading firearms, and may be embodied in pistols, rifles, or shotguns, which may be semi-automatic or fully automatic, but is exemplified herein in a semi-automatic rifle suitable for military use.

The semi-automatic rifles of the prior art with which I am familiar are not certain in their operation under all conditions, for the reason that such guns, which operate by recoil, develop a different amount of force, depending upon the condition of the primer and the amount of charge in each shell. Such guns as have their ejecting and loading mechanism, in the prior art, operated by gas from the explosion, are subject to the same defect, that the amount of force depends on the strength of the charge and the condition of the primer.

Guns of the prior art which transmit the force of the gas of the explosion to springs are subject to the same defect, that the amount of force may be insufficient or excessive; and an insufficient amount of force may cause the gun to fail to eject or fail to load, whereas an excessive amount of force may break the parts or subject the gun parts to excessive strains and wear.

Another of the objects of the present invention is the provision of an improved self-ejecting and self-loading firearm, which is adapted to operate certainly and smoothly independent of the strength or weakness of the charge or the condition of the primer, for the reason that the present firearm is adapted to utilize the explosive force of the gas until a spring has been compressed only to a certain predetermined desired amount, thereafter releasing all of the gas immediately. Thus the characteristics of the piston and spring may be made such that the spring is always compressed sufficiently to operate the ejecting and loading mechanism, but no more energy than desired can be impressed upon the spring because the rest of the gas is immediately and completely released when the spring receives its desired tension.

Another object of the invention is the provision of an improved self-ejecting and self-loading firearm of the class described, in which the gas acts forwardly toward the muzzle when discharged is discharged in the same direction as the muzzle so that there is no backward discharge of gas toward the user, nor any necessity for close fitting or packed piston rods which might become fouled or corroded by discharging gases.

Another object of the invention is the provision of an improved firearm construction of the class described, which is so constructed that the barrel can be cleaned from the breach where it should be cleaned, because cleaning from the muzzle tends to wear the rifling by means of the cleaning rod, whereas the rifling is already slightly tapered at the breech.

A further object of the invention is the provision of an improved gun construction in which the breech is fully enclosed and cannot be opened by mishandling, such as a jar on the butt of the gun, and in which the breech is normally locked shut against firing when there are no shells in the magazine or breach, and is normally unlocked and in firing condition except for the safety when the gun is loaded.

Another object is the provision of an improved gun construction of the class described, which operates smoothly and certainly and will not fail to eject and reload when the gun is held loosely in the hand at the side of the user without resisting recoil, and will not fail to eject and reload whether it is pointed up or down or in any other direction.

Another object of the invention is the provision of an improved gun mechanism, all of the parts of which are suitably enclosed and protected, which is light in weight and lighter than similar guns of the prior art, which is simple in construction, sturdy, which has a minimum number of parts and less parts than the guns of the prior art which perform similar functions, which has no loose pins and which may be used for a long period of time without necessity for repair or replacement of its parts.

Still a further object of the invention is the provision of an improved trigger mechanism, which is more sensitive yet perfectly safe, and which comprises a spring and toggle arrangement with the parts located past dead-center when the trigger is cocked so that the trigger need only be lifted past dead-center to trip it, the amount of force to lift it is a minimum and both the amount of force and the amount of movement of the trigger may be adjusted by adjusting the points of pivot of one of the toggle levers.

Another object of the invention is the provision of an improved securing device for securing the forepart of the barrel to the stock, including a metal band which surrounds the barrel and has a notch to engage a part on the barrel to prevent turning, and a suitable wedging hook engaging a plate on the lower side of the stock to assure a tight mounting and to arrange the parts so that the recoil will tend to tighten the mounting.

Another object of the invention is the provision of an improved mechanism for securing the breech of the barrel to the stock, which includes trunnions for pivotal movement of the breech on the stock, and a toggle link for pivots which pass dead-center to assure a tight mounting of the breech against a mounting plate having a large area for transmitting the force of recoil to the stock, and a suitable tank which is securely embedded and anchored in the stock.

Another object is the provision of an improved trigger guard which guards the trigger only where it is necessary, and provides greater freedom of action to the user, and the provision of an improved breech block mechanism, the forepart of which is pivotally mounted on the rear part so that the forepart may be moved downwardly into locking engagement in front of locking lugs fixedly mounted with respect to the barrel.

Another object is the provision of an improved gun mechanism which operates more smoothly, with freer action and less friction, and less wear on the parts than the devices of the prior art; and which may be manufactured at a lower cost than the devices of the prior art which are constructed for the same purpose.

Another object of the invention is the provision of an improved breech block and receiver construction, in which the block operates with a minimum amount of friction by so arranging the block that it moves continuously from the open to the locked position without a stop and turning motion, as in the prior art, and without rubbing the face of the block against the cartridge, nor rubbing the locking lugs against the lug seats, thus providing a smoother action and reducing the friction to a minimum.

Other objects of the invention will be apparent from the following description and the accompanying drawings, in which similar characters of reference indicate similar parts throughout the several views.

Referring to the drawings of which there are thirteen sheets accompanying the specification;

Fig. 1 is a fragmentary side elevational view of the assembled gun showing the stock end of the gun;

Fig. 1a is a similar view of the middle portion of the gun continuing from the right end of Figure 1;

Fig. 1b is a similar view of the remaining end portion of the gun, beginning at the right of Figure 1a and extending to the muzzle;

Fig. 2 is a fragmentary top plan view of one end portion of the gun beginning with the stock;

Fig. 2a is a similar view of the middle portion of the gun continuing from the right end of Figure 2;

Fig. 2b is a similar view of the remaining end portion of the gun continuing from the right end of Figure 2a;

Fig. 3 is a fragmentary bottom plan view of the end portion of the gun which begins with the stock;

Fig. 3a is a similar view of the middle portion of the gun continuing from the right end of Figure 3;

Fig. 3b is a similar view of the remaining end portion of the gun extending to the muzzle and continuing from the right end of Figure 3a;

Fig. 4 is a vertical sectional view taken on a plane passing through the axis of the stock, with parts of the stock and housing broken away to show the position of the parts when the gun is closed and the magazine is inserted with the hammer cocked;

Fig. 5 is a fragmentary top plan view of the loading mechanism shown apart from the receiver, with the parts in the position that the loading rod catch has, when engaging the action rod;

Fig. 6 is a similar view, with the parts in the position they assume after the action rod has moved to the right sufficiently to cause the loading rod to move a shell into position to be engaged by the breech, and the action rod has now become disengaged from the catch of the loading rod;

Fig. 7 is a fragmentary vertical axial sectional view of the part of the mechanism of both the breech block and firing mechanism, in the position which they assume after the shell has been inserted into the barrel;

Fig. 8 is a vertical sectional view taken on the plane of the line 8—8, looking in the direction of the arrows;

Fig. 9 is a vertical sectional view taken on the plane of the line 9—9 of Figure 7, looking in the direction of the arrows and omitting the breech block and other details which are in front of this plane to emphasize the illustration of the trigger mechanism;

Fig. 10 is a view similar to Figure 7, showing the parts in the position which they assume after the hammer has been released and is in contact with the firing pin;

Fig. 11 is a fragmentary view similar to Figure 10, omitting the firing mechanism but showing the breech block being returned to its open position, and now located at the point where the empty shell is being ejected;

Fig. 12 is a view similar to Figure 10, with the breech block open, showing a fragment of the magazine filled with shells, with the loading rod in position to push one shell out of the magazine into position to be engaged by the block;

Fig. 13 is a view similar to Figure 12, with the breech block and loading rod in the position which they assume when the block is closing, and a shell has already been moved up into position to be engaged by the breech block which will drive it into the barrel;

Fig. 14 is a fragmentary side elevational view of the receiver, breech end of the barrel and operating rod, showing the operating rod in the forward position with the action lock which secures it there when there are no shells in the magazine;

Fig. 15 is a fragmentary bottom plan view of the mechanism of Figure 14, showing the operating rod engaging the loading rod catch;

Fig. 16 is a transverse sectional view taken on the plane of the line 16—16 of Figure 14, looking in the direction of the arrows, showing the pivot for the action lock;

Fig. 17 is a transverse sectional view taken on the plane of the line 17—17 of Figure 14, looking in the direction of the arrows and showing the upwardly projecting actuating member, by means of which the action lock is manually released;

Fig. 18 is a transverse sectional view taken on the plane of the line 18—18 of Figure 14, looking in the direction of the arrows, showing the locking arrangements of the action lock;

Fig. 19 is a transverse sectional view taken on the plane of the line 19—19 of Figure 14, showing additional details of the action lock;

Fig. 20 is a bottom plan view of the receiver, showing a shell in the act of being inserted in the barrel by the breech, the loading rod having completed its function;

Fig. 21 is an exploded view in perspective, showing all of the parts which are associated with the main spring and its housing, by means of which the breech is automatically opened and closed, and latched in either position;

Fig. 22 is an exploded view in perspective, showing all of the parts of the firing mechanism;

Fig. 23 is an exploded view in perspective, showing all of the parts of the breech block, including the extractor and firing pin;

Fig. 24 is a side elevational view in partial section on a vertical plane passing through the axis of the barrel, showing the details of the mode of actual mounting of the barrel on the front end of the stock and the details of the main spring, cylinder and piston, by means of which the main spring is given its operating compression;

Fig. 25 is a transverse sectional view taken on the plane of the line 25—25 of Figure 24 on an enlarged scale;

Fig. 26 is another transverse sectional view taken on the plane of the line 26—26 of Figure 24, looking in the direction of the arrows;

Fig. 27 is a similar view taken on the plane of the line 27—27 of Figure 24, looking in the direction of the arrows;

Fig. 28 is a similar view taken on the plane of the line 28—28 of Figure 24, looking in the direction of the arrows;

Fig. 29 is a fragmentary side elevational view which represents a continuation of the right end of Figure 14, showing the barrel when removed from the stock, with the main spring housing and retractor spring;

Fig. 30 is a bottom view of the mechanism of Figure 29, and represents a continuation extending from the right of Figure 15;

Fig. 31 is a fragmentary side elevational view of the barrel removed from the stock, showing the same mechanism as Figure 24, with the piston in its extreme right position at the moment when all of the excess gas is being instantaneously discharged in a forward direction;

Fig. 32 is a side elevational view, with the barrel tilted relative to the stock and the toggle link placed in proper position to effect its securement when the barrel is pivoted downward to the position of Figure 4;

Fig. 33 is a view in perspective of the toggle link, by means of which the breech of the barrel is secured to the stock;

Fig. 34 is a top plan view of that part of the receiver 134 which cooperates with the toggle link 136 in securing the rear end of the barrel to the stock; and Fig. 35 is a fragmentary side elevational view showing how the lugs on the breech block move down in front of the shoulders on the receiver, and lugs on the breech block cover move forwardly over those of the block to lock them in this position when the block is closed.

Referring to Figure 1, 40 indicates in its entirety the gun assembly, which includes the stock 41, barrel assembly 42, breech block assembly 43 and magazine 44, these being the main parts visible in this figure.

The stock may have its rearward portion of any suitable shape, but is preferably formed behind the trigger 45, with a pistol grip portion 46 and forwardly of the trigger, with a substantially flat lower surface 47 that is adapted to support a metal plate 48 serving both as a trigger guard and a magazine guide.

The lower part of the stock at the pistol grip 46 is preferably formed with a concave rounded lower surface 49, providing sufficient space behind the trigger for the remaining three fingers of the hand to grip the pistol grip 46, and providing additional space in front of the trigger 45 to receive the trigger finger even when covered with a glove, with the finger out of contact with the trigger.

As the trigger 45 cannot be actuated by forces applied to its rear side 50, it is guarded only at its lower end or point 51 and curved front side 52 by the trigger guard plate 48. This plate is shown at the right end of Figure 3, and it comprises an elongated steel plate which tapers toward its rear end portion 53, which serves as the trigged guard.

The tapered trigger guard portion 53 extends backwardly of the flat surface 47 of the stock, Figure 1, sufficiently to extend under the point 51 of the trigger and to guard the front of the trigger. The rest of the trigger guard plate 48 is shown in Figure 3a, and it will be noted that it is provided with a pair of apertures for wood screws 54 that are driven into the bottom of the stock.

At its forward end the plate 48 is also tapered and rounded, and it is provided with a magazine aperture 55 which is substantially rectangular but has a circular forward end 56 corresponding substantially to the shape of the magazine housing, the magazine being shown in place in Figure 3a and indicated by the number 44.

Referring to Figure 4, the lower flat surface 47 of the stock is provided with a shallow rectangular groove 58, which is adapted to provide guiding surfaces for a magazine latch 59. The magazine latch is merely a flat strip of steel, the forward edge 60 of which is like a blunt knife edge for engaging in a complementary groove 61 in the magazine housing 44 to retain the magazine in the gun assembly.

The magazine latch plate 59 is held in its groove 58 by the trigger plate 48 which permits it to slide, and the stock preferably has a bore 62 for housing a spring 63. The spring 63 has one end 64 held in a complementary bore in the stock, and its other end 65 caught in a hole in upwardly extending tang 66 on the latch plate 59.

Between its ends spring 63 preferably has a safety-pin loop 67, and the ends of the spring are urged apart urging the latch plate 59 toward the right in Figure 4. The latch plate 59 is also formed with an outwardly and upwardly curved finger piece 68, Figure 1a, which is housed in a curved recess 69 in the stock 41 so that the latch plate 59 may be moved backward against the spring 63 to withdraw its latching edge 60 from the groove 61 of the magazine housing 44. This permits the magazine to be withdrawn from its recess. The stock is also formed with an oval recess 70 corresponding in shape substantially to the opening 55 in the plate 48 for receiving and guiding the magazine and holding it in proper position.

The magazine

The magazine 44 is shown in bottom plan in Figure 3a, in side elevation and partial section in Figure 4. The magazine 44 includes a housing 71 which may be formed of a plate of steel that is bent to substantially U-shape, having two flat side walls and the curved end wall 70. The free ends of this plate are joined by a flat end wall 73 which may be soldered or welded to them providing a housing which is open at the top and bottom.

At the bottom this housing has two pairs of inwardly turned retaining flanges 74, Figure 3a, which engage a removable bottom wall 75, Figure 4. The removable bottom wall 75 comprises a metal strip of substantially rectangular form rounded at its right end, Figure 3a, and adapted to be received inside the housing 71 between its walls above the retaining flanges 74. At its left end, Figure 4, bottom plate 75 has an upwardly extending lug 76, with a partially cylindrical recess 77 on its right side.

This recess 77 receives one of the partially cylindrical formations 78 in the magazine spring 79, which may be formed of substantially M-shape. Thus the spring 79 has three such cylindrical formations 78, 80, 81, and it has a lower leg 82 that engages the bottom plate 75. Its upper leg 83 is preferably fixedly secured to the top plate 84 by being slid endwise into suitable slots in the downwardly projecting lugs 85, while the cylindrical bend reacts against a partially cylindrical groove 86 on an angle bracket 87.

The top of the magazine housing has inwardly turned curved flanges 88, Figure 4, near the rear wall for engaging the shell housing and holding the shells in the magazine. Forwardly of these curved flanges 88 there are two upwardly projecting straight flanges 89, and there is an open space or groove 90 between the flanges 88 and 89 through which the rim of a shell may pass after it has been pushed forwardly out from under the flanges 88.

Rearwardly of the retaining flanges 88 there is an opening 91 exposing the rear of the upper shell but leaving enough of the rear wall 73 to hold the shell. The loading rod acts through this aperture 91. Thus the top wall of the magazine is secured to the spring and is constantly urged upward by the reaction of the spring against the lower wall.

The barrel and receiver assembly

The present semi-automatic mechanism may be embodied in pistols, rifles or shutguns, but the embodiment selected to illustrate the invention is an automatic rifle.

The barrel 42 is, therefore, an elongated tubular metal member of steel, which is provided with the rifled bore 92 the open muzzle end of the bore being indicated at 93. Adjacent its muzzle end the barrel 42 carries a suitable sight-bead or ridge 94, which may be of any suitable construction and forms no part of the invention, Figure 26.

Adjacent the breech end of the barrel, the barrel carries a suitable sight-base 95 (Figure 2a) comprising a larger sleeve. The rifled bore 92 (Figure 12) terminates at the breech of the gun in an enlargement 96 forming a shell chamber, the enlargement 96 being joined to the bore 92 by a tapered portion 97 corresponding to the shape of a shell housing. When the shell has its housing 98 (Figure 10) with its tapered portion 99 engaging the tapered shoulder 97 in the barrel, the shell has its rim 100 and annular groove 101 exposed in a frusto-conical recess 102 at the rear end of the barrel that is the breech, so that it may be grasped by the extractor.

The bullet may be indicated by the numeral 103. The barrel is secured at its rear end to a frame for supporting the gun mechanism, called the receiver 104, and for this purpose the rear end of the barrel may be threaded at 105 and threaded into a bore 106 in the receiver against an annular shoulder 107.

The receiver is shown in bottom plan in Figure 20, in side elevation in Figure 14, in bottom plan in Figure 15, in side elevation as to its inner wall in Figures 7 and 10, in section in Figures 8 and 9 and also in section in Figure 12.

Referring to Figure 20, the receiver comprises a pair of substantially parallel rearwardly extending walls 108 and 109, joined by the front wall 110 which has the bore 106 into which the barrel is threaded. Looking at the bottom side of the receiver, there is an enlarged rectangular aperture 111 adjacent the breech recess 102. The bottom surfaces 112 of the two side walls 108, 109 may be plane, and the side walls 108, 109 are joined intermediate their ends by an integral transversely extending bridge 113, Figure 9.

This bridge 113 is substantially rectangular in cross-section, but is reduced in thickness at its central portion 114, Figure 9, thus providing side shoulders 115 which keep the firing mechanism centrally located on the bridge 113.

Toward the right of the bridge 113 the bottom of the receiver has a substantially rectangular recess 116, which has inwardly extending tapered flanges 117 adjacent the aperture 111 for guiding the shell into the barrel. The flanges 117 are close enough together so that when the shell reaches the position of Figure 20 it is guided above the flanges 117, but when the shell is in the position of the top shell, in Figure 12, the narrower part of the shell may pass between the flanges 117.

Rearwardly of the bridge 113 the bottom of the receiver, Figure 15, has an elongated rectangular aperture 118 which is open at the rear end, presenting two rearwardly extending leg portions of the walls 108, 109. Looking at these walls in side elevation, Figure 4, the wall 109 is formed with a half-cylindrical bearing surface 119 that is adapted to engage a complementary forwardly facing half-cylindrical trunnion flange 120 that is carried by the reaction plate 121 fixedly mounted on the stock 41.

Below the rearwardly extending tongue 122 of the receiver wall 109, which tongue has the groove 119, the wall 109 is formed with a rectangular groove 123, and the tongue 124 which remains below the groove 123 is reduced in thickness, making a thinner wall so that a hook 125 of the hammer housing 126 may be mounted with the forward end of the hook 125 in the groove 123, and the upwardly extending portion of the hook 125 outside of the thin part 124 of each receiver wall 108, 109. Thus the rear end of the hammer housing has its hook 125 mounted in the groove 123 and lateral movement of the hammer housing is prevented by the hooks 125 being outside the thin wall portion or tongue 124.

To further explain the function of the bridge 113 at this time, the hammer housing is associated with the lock housing 127, Figure 22, and when assembled has a forwardly extending supporting flange 128, Figure 22, which rests upon the receiver bridge 113.

The side walls or legs 108, 109 of the receiver may have any suitable exterior shape but are made thicker toward the forward end of the receiver as, for example, they are thickest at 129 outside the aperture 111. They are slightly thinner at 130 on either side of the aperture 116, but at the rear end on both sides of the open aperture 118 is the thinnest portion 131 of these legs or side walls 108, 109.

It should be understood that the present drawings are made from a hand-made gun, the parts of which were necessarily made out of soft steel, and in order to make them strong enough they had to be made heavier and thicker than they would be made when made of tempered steel. Thus the parts of the gun may be made smaller and lighter when made of tempered steel than the proportions which are shown in the drawings.

The inner sides of the walls or legs 108, 109 are formed with an inwardly extending rib 132, the top of which rib forms, Figure 10, a bed or guide 133 for the breech block, and this top rib surface 133 extends substantially from end to end of the side walls 108, 109 terminating at the rectangular aperture 111, Figure 20. In other words, the walls 108, 109 are thicker at the bottom, providing a flat guide surface 133 inside each wall, this guide surface being flush with the top of the bridge 113, Figure 9.

Above the bridge 113, Figure 12, each side wall 108, 109 is formed with a partially cylindrical groove or bearing 134, and this bearing 134 faces upward and slightly forward providing a retaining hook formation 135 on its rear wall for engaging the trunnions of the toggle link 136, by means of which the rear end of the barrel is secured to the stock, Figure 32.

The tilting of the half-bearing surfaces 135, Figure 12, forward as well as upward, tends to retain the trunnions of the toggle link 136 in these bearings when the toggle link is lying flush with the top of the receiver and holding the receiver and barrel to the stock.

Referring to Figure 12 again, to the right of bearing groove 134 each wall 108, 109 is thickened at the beveled surface 137, and formed with a downwardly facing guide surface 138 on an inwardly extending rib 139 for serving as an upper guide for the breech block assembly 43, as shown in Figure 8.

Figure 12 shows a section in which the rear of the breech block assembly 43 has its parts provided with laterally projecting guide formations 346 sliding in the grooves that are formed between the surfaces 133 and 138 of the receiver walls 108, 109. Thus at the forward position of the breech block assembly 43, Figure 10, the breech block is guided by having its parts 346 sliding in the groove 141, but the front (right) end of the breech block is then above rectangular aperture 111, and moves down into said aperture.

The lower rib 132, Figure 12, terminates in forwardly facing shoulders 142, Figure 20, just forward of the inwardly extending flanges 117 in the aperture 111, and the shoulders 142 are the locking lugs by means of which the breech block assembly is locked against rearward movement.

The breech block assembly includes two parts pivotally mounted upon each other, the forward part having a rearwardly facing shoulder 143, Figure 12, which moves down in front of the breech block locking lug or shoulder 142 when the block is in position against the cartridge which has been suitably seated in the cartridge housing 86.

Suitable means are provided for holding the parts in this position so that the reaction of the shell is taken by the rearwardly facing shoulders 143 against the forwardly facing shoulders 142 on the receiver.

The receiver also carries at its forward end, Figure 20, a depending bearing lug 144 for pivotally supporting the trunnion 145 in a bore 146, this trunnion being the pivotal support for an operating rod latch 147.

*The operating rod latch*

The operating rod latch 147 is shown in perspective at the upper left of Figure 21. This latch comprises an elongated metal bar, having an upwardly extending integral lug 150 for supporting the transversely cylindrical portion 145. This trunnion 145 is pivoted in the lug 144 at the forward wall 110 of the receiver. The operating rod latch 147 has a rearwardly extending portion 149, Figure 21, which terminates in a vertically extending flat flange 151 and a laterally extending finger 152.

The finger 152 may be seen in Figure 20, and it extends over into the receiver space 116 in position to be engaged by the uppermost shell in the magazine, so that the uppermost shell actuates the operating rod latch 147 and moves it to unlatching position when there are shells in the magazine.

When there are no shells in the magazine to engage the finger 152 the operating rod latch 147 remains latched and prevents the breech block from being opened unless it is manually actuated. This manual actuation may be accomplished by the finger piece 153, which extends downward in Figure 21, but actually extends upward on the side of the barrel just forward of the sight-base 95, as indicated again at 153 in Figure 2a.

The finger piece 153 may be pressed downward when there are no shells in the magazine to open the breech. It should be noted also that while the left-hand portion 149 of the action rod latch 147 is located below the receiver, the vertical flange 151 extends into a special recess 154, Figure 20, in the inside of the side wall 109, bringing the finger upward into proper position to be engaged by a cartridge in the magazine.

The action rod latch 147 is urged clockwise in Figure 21 by a spring 155, Figure 21, the straight end 156 of which extends into an aperture 157 in the latch. The bent end 158 of this spring is socketed in a hole 159 in the bottom surface 112 of the wall 109. The right end of the action rod latch 147 requires special attention.

The right end portion 148 of the operating rod latch 147 not only has the finger 153, but at its extreme end a finger 160 extending upward in Figure 21 but downward on the gun. The finger 160 supports a laterally extending latching shoulder 169, the purpose of which will be later described. It also has a laterally extending flange 161 and the upwardly extending flange 162. The upwardly extending flange 162 carries another laterally extending flange 163, which has a downwardly extending flange 164, Figure 21.

The operating rod 165 is shown at the lower right of Figure 21, and it is intended to connect together the breech block assembly and main spring housing 166 at the time when the main spring is to open the breech.

We now refer to the right end of the operating rod 165, which has a reduced square portion 167 terminating at a shoulder 168. The horizontal flange 163 on the operating rod latch 147 engages the shoulder 168 on the operating rod 165 (Fig. 21) whenever this operating rod is to be latched to hold the breech block open. The result is that the operating rod, which is connected to the breech block, locks the breech block open whenever the operating rod latch 147 is urged by its spring 155 into engagement with the shoulder 168.

The rearward shoulder on slot 276 of action rod 165 engages 163 to latch the breech block closed unless it is opened manually or by firing. There must be a shell ready in the magazine engaging the finger 152 of the operating rod latch 147 (Fig. 21) to move it against its spring so that flange 163 is out of the way of shoulder 168. The result is that one may press the finger piece 153 to release the operating rod, and thus to permit one to close the breech block; but the breech block is automatically unlocked when there is a shell in the magazine.

The operating rod latch 147 is also adapted to latch the housing of the spring 166 against longitudinal movement. The spring housing 166 is shown right side upward; but in assembly the operating rod latch 147 is inverted, and the inwardly extending shoulder 169 on the action rod latch 147 is in position to engage shoulder 170 on the spring housing 166 to prevent the spring housing from moving longitudinally, unless the latch 147 is actuated manually at 153 or automatically by a cartridge at 152.

*Securement of the rear end of barrel to stock*

Referring to Fig. 33, the toggle link 136 comprises a transverse yoke 171, which carries a pair of parallel legs 172, 173 of rectangular cross section. The yoke 171 is generally triangular in cross section, but has its apex 174 slightly curved, and its base or opposite forward edge partially cylindrical, as at 175.

The cylindrical parts 175 project laterally beyond the legs 172, 173, and constitute trunnions for engagement with the partially cylindrical bearing grooves 176, Figure 32, on the forwardly extending pivot flanges 177 of the reaction plate 121. These flanges 177 are spaced sufficiently for the legs 172, 173 to be received between them with the partial trunnions 175 pivoted in the grooves or bearings 176.

The reaction plate 121 engages a plane surface 178 at the rear end of the recess in the stock, which is provided for receiving the barrel. Reaction plate 121 has a through bore 179 for passing a screw bolt 180, by means of which it is anchored to a tang 181 having a threaded bore 182.

The tang 181 is carried by an anchor plate 183, which is located in a rectangular recess 184 in the top of the stock immediately behind the reaction plate 121. The anchor plate 183 is curved complementarily to the top of the stock at the pistol grip, and is flush with the top of the stock.

Anchor plate 183 carries the depending thick tang 181, of rectangular cross-section, which is located in a downwardly extending rectangular recess 185 in the pistol grip. The recess 185 is located well behind the plane surface 178 which supports the reaction plate 121, giving a substantial portion of the body of the pistol grip between the reaction plate 121 and the tang 181.

The screw bolt 180 draws the tang 181 and the reaction plate together, and is located in bore 186, extending from the surface 178 to aperture 185, and thus the reaction plate and anchor plate 183 are both firmly secured to the stock by a single screw bolt.

The reaction plate 121 has its upper edge 187 terminating well below the bearing grooves 176, and there is a recess 188 in the top of the stock behind the action plate edge 187 and in front of the anchor plate 183. Recess 188, Figure 32, allows space for the pivotal movement of the lower rear edge 189, Figure 4, of the cover 190 (Figure 4) which encloses the open part of the receiver behind the breech block assembly 43.

The toggle link 136 has each of its legs provided at their forward ends with a laterally projecting cylindrical trunnion 191, 192. These trunnions 192 are adapted to be received in the partially cylindrical recess 134 in the top of the side walls 108, 109 of the receiver.

The rear curved surface 193 of each trunnion is adapted to be caught and retained below the forwardly projecting portion 135, in the bearing grooves 134. The two legs 172, 173 extend parallel to the inside top wall of the receiver which they engage, and these legs 172, 173 form a top guide surface opposite to the bed 133, Figure 12, and a continuation of the downwardly facing guide surfaces 138 for guiding the laterally projecting parts of the breech block assembly.

The toggle link 136 preferably has its trunnions 191, 192 provided with forwardly extending retaining flanges 194, for engaging on the outside of the receiver walls when the trunnions are in the recess 134. These flanges guide the legs into proper position when the parts are being assembled, as shown in Figure 32.

Each trunnion 191, 192 is preferably provided with an integral axially projecting pin 195. These pins are utilized in securing the cover in place, and may be seen in Figure 1a at the top left engaging in a longitudinally extending slot 196 in each of the sides of the cover at its forward edge.

The cover 190 preferably comprises a sheet metal stamping which may be made of suitable steel, and it has a cylindrically curved top wall 197 and a pair of parallel depending side walls 198. These walls 198 are long enough so that the cover may extend from the recess 188 (Figure 2) to a point where it overlaps the breech block assembly, Figure 4. Its depending walls extend downwardly far enough to overlap the side walls 108, 109 of the receiver.

At its rear end it may have a beveled end wall 199 and a flat attaching flange 200 depending therefrom, and provided with a rectangular aperture 201. The rectangular aperture 201 is adapted to receive an upwardly and forwardly curved retaining finger 202, carried by the anchor plate 183, Figure 4 and Figure 32.

Referring to Figure 1a, it will be seen that the front slots 196 in the cover extend backwardly or to the left of the pins 195 on toggle link 136. At the same time the cover, Figure 4, has its aperture 201 about the finger 202 of the anchor plate 183.

The mode of assembly of the cover is as follows:

The cover has its forward end depressed and slots 196 placed about pins 195. The cover 190 is then slid forward until pins 195 hit the base of slots 196, and at this time the rear attaching flange 200 of the cover clears the front end of the finger 202. The cover may then be pushed downward at its rear end and moved backward until the finger 202 is in the aperture 201, and the cover will be retained in place.

Referring again to the toggle link 136, it will be seen that the rear trunnions 175 of the toggle link are hooked behind bearing grooves 176 (Figure 4) (Figure 32) on the reaction plate 121. The forward trunnions 191, 192 of the toggle link are hooked in front of the curved retaining shoulder 135 in the bearing grooves 134 of the receiver walls 108, 109. It has already been pointed out that the receiver walls terminate in bearing grooves 119 at the top of Figure 4. Also the reaction plate flanges 177 have the forwardly extending partially cylindrical bearing formations 120, which engage in the grooves 119 of the receiver, Figure 4.

The method of securement and assembly of the rear end of the barrel with the stock is as follows:

The barrel may be held in diagonal position above the stock, with the rear end of the receiver below the trunnion formations 120, as shown in Figure 22. The toggle link is first inserted in front of the finger 202 in such manner that its trunnions 175 (Figure 32) engage in the bearing grooves 176 of the reaction plate flanges 177.

The legs of the toggle link 136 are then pressed downward until the front trunnions 191, 192 move into the grooves 134 in front of the retaining shoulder 135. The barrel may then be lifted at its muzzle end until the bearing grooves 119, in the rear end of the receiver, can be brought up into position to receive the trunnion flanges 120 (Figure 32) on the edge of the flanges 177.

At this time trunnion flange 120 presses forwardly in groove 119, and trunnion 175 on the toggle link is pulled forwardly in groove 176, and trunnions 191, 192 pulled backwardly in groove 134 on the barrel assembly.

As the barrel is pivoted downward into its groove in the stock, this relation is maintained and the length of the toggle link is such that when the barrel reaches horizontal position the toggle link pulls the barrel assembly backward tightly against the trunnions 123, carried by flanges 177 of the reaction plate 121.

In some embodiments of the invention the toggle link 136 may have its pivotal axes so arranged with respect to the axis of the bearing 119 that the axis of bearing 119 is above the axes of bearings 176 and 134 at this time, and this will lock the toggle link with the barrel in horizontal secured position.

However, it is necessary to provide securement for the front end of the barrel, and when the front end is secured to the stock this effectively holds the toggle link at the rear end in such position that the rear end is positively secured until the front end is released.

*Securement of barrel assembly at front end of stock*

The barrel 42 (Figure 2b) may be provided on its upper side, rearwardly of the front end 203 of stock 41, with a welded upwardly projecting rib or lug 204, Figure 26, which may be rectangular in plan and adapted to be received in a complementary slot 205 in the front securing band 206. The securing band 206 is shown in greater detail in Figures 24 to 31.

Referring to this band member in Figures 26 and 27, the securing band 206 comprises a metal member, the upper part 207 of which is partially cylindrical and formed with a cylindrical bore 208 extending over more than half the circumference of the barrel 42.

The lower part of the band member 206 has a pair of thick depending side walls 209, 210, and a flat bottom wall 211, forming a lower rectangular or box-like portion indicated in its entirety at 212. The rectangular lower portion 212 of the band member 206 is adapted to be received in a complementary recess 213, in the forward part of the stock 41, and the rectangular recess 213 is a part of the continuous groove or recess 213 which extends longitudinally of the stock, and is open at the upper side of the stock.

Adjacent the band member 206 the stock is also formed with a smaller rectangular recess 214, Figure 26, and with a through aperture 215 for securing devices that cooperate with the band 206.

The cylindrical portion 207 extends about the barrel 42, and is pulled backwardly on the barrel until the lug 204 is seated in the groove 205. This prevents the band member 206 from rotating on the barrel and holds it in position depending from the barrel.

Band member 206 also provides a support for a front main spring guide bracket 216, Figure 24, which also serves as a latching member. This guide bracket 216 has a rectangular body 217 (Figure 26) which fits in a complementary rectangular aperture 218 in the depending box-like portion 212 of the band member 206. It also has a cylindrical bore 219, which receives the front end of the tubular spring guide 220 for the main spring 221, supporting this tubular guide 220 and parallel to it in Figure 24.

The rectangular aperture 218 (Figure 26) is also provided at each of its sides with shallow rectangular slots or grooves 222, Figure 26, for slidably supporting the two legs 223 of the main spring frame, indicated in its entirety by the numeral 166, Figure 26, and seen in perspective in Figure 21.

The band member 206 and the body 217 of the bracket 216 act as guides for supporting the main spring frame 166 for its sliding movement. The bracket 216 (Figure 24) is also provided with a laterally tapered depending flange 224, having a forwardly extending keeper lug 225 for securing the barrel to the stock, and a forwardly extending retaining bar 226 for securing the bracket 216 to the band 206.

The retaining bar 226 is rectangular in cross-section and long enough to project from the forward end 203 of the stock. The projecting end 227 of this retaining bar 226 serves as a manual actuating member, by means of which the bracket 216 may be reciprocated against the spring 221 to effect a release, as will be presently described.

The band member 206 has its lower rectangular body portion 212 provided with a pair of rectangular stirrups 228, Figure 24, Figure 26, these stirrups having rectangular aligned apertures 229 for slidably supporting the retaining bar 227. The stirrups 228 are located forwardly of the depending part 224 of the bracket 216 in a suitable recess in the stock.

The keeper lug 225 extends forwardly from the depending portion 224 of bracket 216, and is tapered toward its end so that it may have a wedging action in connection with the stirrup 230 of the front anchor plate 231, Figure 26. This front anchor plate 231 has a flat body flange 232 which may be rectangular in shape, and substantially as wide as the stock at this point.

The flat body 232 has an inwardly projecting rectangular stirrup 230, with a rectangular aperture 233, Figure 26, for receiving the wedging keeper lug 225. The lower side of the keeper lug 225, Figure 26 and Figure 24, has a clearance with respect to the body 232 of the front anchor plate 231, but the upper side 234 of the keeper lug 225 wedges against the top side of the rectangular aperture 233, and draws the plate 231 upward (Figure 24) at the same time it draws the band member 206 and barrel 42 downward.

Thus the keeper lug 225, when urged toward the right, pulls the barrel tightly against the stock, and one end of the main spring 221 is seated against the left side 224 of the bracket 216. The bracket 216 may also slide on the spring guide 220. Thus the main spring 221 urges the bracket 216 toward the right into position to clamp the barrel to the stock.

The right side of the stirrup 230 (Figure 24) engages the right side of the aperture 215 so that the anchor plate 231 and stirrup 230 cannot move longitudinally of the stock 41. The projecting end 227 of the rectangular bar 226 may be used to push the bracket 216 toward the left, in Figure 24, against the compression of spring 221. When this is done the wedging keeper lug 225 moves to the left out of the stirrup 230 and the plate 234 is released, with the result that the band member 206 and barrel 42 are released from the stock 41.

Referring to Figure 21, there the band member 206 and the bracket member 216 may be seen in perspective. The clamping band member 206 also supports a cylinder 235 (Figure 24), the details of which are shown in perspective in Figure 21. Cylinder 235 comprises a tubular steel member having an outer cylindrical surface 236 and a cylindrical bore 237.

The cylinder 235 is supported at its rear end by an integral rectangular block 238, which has three plane sides 239, 240, 241, but the top side 242 is partially cylindrical and fits the lower side of the barrel 42.

The lower side 241 has a depending lug 243, thus providing a rearwardly facing shoulder 244, which engages the front edge of the rectangular body 242 and determines the position of the block in the clamping band 206.

The top curved surface 242 is provided with an enlarged cylindrical bore 245, which communicates with a bore 246 in the lower wall of the barrel 42, Figure 24. The purpose of the bore 246 is to permit the gas of the explosion which follows the bullet to pass through bores 246 and 245 into the cylinder 235, as soon as the bullet has passed the bore 246.

At its forward end cylinder 235 is half cut away, as indicated at 247, Figure 21. The main purpose here is that after the plunger has moved forward to the right, in Figure 24, to such a point that the rear end of the plunger is exposed, the gases in the cylinder will then be immediately discharged freely and forwardly so that the plunger will not be moved any farther. Thus the gases acting on the plunger 248 can only compress the spring 221 to the same predetermined point on each occasion, and the excess compression of the gases is released.

The amount of movement of the plunger 248 is made such that it utilizes only a portion of the movement available by the compression of gases passing into the cylinder, and the compression imparted to spring 221 is thus made sufficient, whether the charge in the bullet be light or heavy, and the force exerted by the main spring 221 in opening and closing the breech and reloading will always be the same.

Furthermore, there are no rearwardly extending connecting rods which might be fouled by the gases; there is no rearward discharge of the combustion gases and all of the gas is discharged forwardly.

The plunger 248 comprises a cylindrical steel rod, the outer end of which is laterally bent, as shown at 249. This laterally bend end 249 extends outwardly of the half-cylindrical trough of the cylinder at 247, and projects into an aperture 250 in a cross-frame member 251, which joins the legs 223 of the main spring housing 166.

The plunger 248 is thus connected to the main spring housing 166, which it is adapted to move toward the right, in Figure 24, under the impulses of the gases in the cylinder 235. The main spring housing 166 is shown in perspective in Figure 21. We have already described the two parallel legs 223, which slide in the guide grooves 222, Figure 26, and the end frame member having the aperture 250 for connection to the plunger rod 248.

At a point intermediate its ends the parallel side frame members 223 of the main spring housing 166 are provided with a downwardly projecting curved bridge 252, which is so shaped that it avoids interference with the spring 221, but carries a headed lug 253 for engagement with the hooked end 254 of the retractor spring 255.

The other end 256 is hooked about a downwardly extending lug 257, carried by the action rod 165, Figure 21. Retractor spring 255 is employed to close the breech after it has been opened by the main spring and after the main spring has been disconnected from the breech.

Referring again to the main spring housing 166, Figure 21, the parallel legs 223 of the main spring housing are joined at their left end (Figure 21) by a thick end wall 258, having an axial bore 259 adapted to receive the tubular main spring guide 220. The guide 220 slides in the bore 259 when the main spring 221 is compressed between the bracket 216 and the end frame member 258, of the main spring housing 166, as that housing is moved toward the right in Figure 24 by the plunger 248.

The spring housing also has a downward offset at 260, which carries an integral rearwardly extending flat bar 261 to support a camming shoulder 170 for unlatching the action rod.

The shoulder 170 is formed by a groove cut laterally into the bar 261, and shoulder 170 is engaged by the laterally turned finger 169 on the latching member 147 (Fig. 21). When finger 169 is depressed below the bar 261, then the main spring housing slides free of it.

At its left end, Fig. 21 (rear end), the bar 261 on main spring housing 166 supports a latching pawl 262, which is provided with its own integral pin 263 for reception in an aperture 264 in bar 261. Bar 261 is made thinner at the pivot flange 265 by an amount equal to the thickness of the pawl 262, and the pawl is held in place by engagement with a flat guide surface 266 (Fig. 14) on the bottom of the sight-base.

This flat guide surface is provided with a transverse slot 267 (Fig. 15) used when the pawl is to be assembled with its pin in the aperture 264, the pawl being inverted transversely at that time. Thereafter the pawl extending lengthwise slides over the slot 267.

The pawl 262 has a beveled end 268 and a laterally projecting latching lug 269. Lug 269 has an abrupt retaining shoulder 270 and a curved camming surface 271 on the other side. Opposite the latching lug 269 there is a stop flange 272, which limits the rotation of the pawl on the bar 261 in one direction.

Stop flange 272 is pressed against stop surface 273 on the attaching flange 265 (Fig. 21) by a hump in the spring 274. Spring 274 urges the pawl 262 into a position where the beveled end 268 extends longitudinally of the bar 261, and the latching lug 269 projects laterally from the bar 261, as shown in Fig. 15.

Thus the latching lug 269 (Fig. 15) of the pawl 262 tends to project into position to engage the action rod 165, which has a slot 275 (Fig. 21) for receiving the latching lug 269 of pawl 262. When the lug 269 is engaged in the slot 275, as shown in Fig. 15, the main spring housing and the action rod are adapted to move backward together to open the breech block; but the main spring housing pushes the action rod only in one way, toward the left in Fig. 15, by means of the abrupt shoulder 270 on pawl 262.

When the main spring housing approaches the limit of backward movement, end 268 of pawl 262 engages the lug 144, unlatching pawl 262 from the action rod so that the main spring housing may move forwardly on the barrel without pulling the action rod.

Thus the main spring housing and the main spring push the action rod back, but become disconnected from it upon a reverse motion.

Referring to Fig. 17, this shows the pawl 262 engaged in the slot 275 of action rod 165. Fig. 18 is located at the latching end 161 of the action rod latch 147, and shows the action rod latch in its lower position, with the finger 169 in the slot 170, which is adapted to cam finger 169 downward, disengaging latch bar 163 from action rod shoulder 276.

In this position the action rod 165 is also latched against movement by engagement of its keeper notch 276 with the keeper flange 163 (Fig. 21).

The relatively thick body 277 is a guide block, carried by the forward end of the sight-base for guiding the bar 261 on the main spring housing 166, and guiding the extension 278 at the right end of action rod 165, Figure 18, Figure 21.

This guide 277 also holds bar 261 and action rod portion 278 against lateral movement so that they cannot move away from the latching shoulders carried by the action rod latch 147.

Referring to Figure 19, this shows the latching flanges 160—164 and 169 that appear at the right end of action rod latch 147, Figure 21. The main spring housing is in the latched position and the same is true of the action rod 165, which is in its forward latched position.

The spring 274 urges the pawl 262 into its latching position. One end of the spring has a backwardly turned laterally extending portion 279, which may extend half way around the pivot lug 144, Figure 20, where the end 279, of Figure 21, is anchored in a transverse bore 280, Figure 20.

The spring then extends longitudinally of the barrel in such manner that it engages a flange 281 (Figure 21) on the pawl 262. The other end of spring 274 is formed into a rectangular hook 282, Figure 15, which passes transversely of the guide 266 on the bottom of the sight-base into a groove at 283, then backwardly on the other side (top) Figure 15 of guide 260, and has its end 284 anchored in a transverse bore. Thus both ends of the springs 274 are anchored, and its middle portion urges the pawl 262 into latching position.

The operating rod 165 is shown in perspective at the bottom right of Figure 21. It has a forward portion 278 which slides in the guide 277, Figure 18, adjacent the sight-base, and offset portion 285 adjacent the slot 275, and a forwardly disposed portion 286 which is located to engage and slide on the bottom plane surface 112 of the receiver.

The forward portion 278 of the action rod may be rectangular in shape, and at its extreme end it has a reduced rectangular portion forming a shoulder 168. This shoulder 168 is adapted to engage the transverse flange 163, Figure 21, on the action rod latch 147 to latch the action rod in open position.

The forward portion 278 also has the latching shoulder 276, by means of which it may be latched in the forward position by engagement with flange 163. In the offset portion 285 there is the transversely extending slot 275 to be engaged by the pawl 262 when the main spring housing and latching rod are to move together.

The rear portion 286 of the action rod 165 is beveled at 287 to clear the sight-base, but is otherwise generally rectangular in shape. At its rear end it has an upwardly extending flange 288, which is offset inwardly so that when the action rod is parallel with the inner surface of the receiver 108, flange 288 extends upwardly in the open ended slot 118 of the receiver, Figure 20.

Flange 288 has a laterally projecting guide flange 289, which rides on the bed 133 of the receiver. At its upper end it has a forwardly projecting head 290, the top surface of which is curved and provided with a rectangular slot 291.

Slot 291 receives a depending lug 292, Figure 12, carried by the breech block assembly, and, in particular, lug 292 depends from the manual actuating member 293 (Figure 23) carried by the breech block. The actuating member 293 being fixedly mounted on the breech block, thus the action rod 165 is connected to the breech block to slide the breech block back and forth.

Action rod 165 also has its rear portion 286 provided with a lateral slot 294 (Fig. 21) for engagement with the shoulder 476 on loading rod catch 466 (Fig. 20). Besides the action rod moving the breech block back and forth, on its forward motion the action rod moves the loading rod through engagement with the catch 295 in the slot 294; but the forward end of slot 294 is beveled at 296, and the loading rod catch 466 is so shaped that the catch only engages and is actuated by the action rod on forward movement of the action rod.

Referring to Fig. 23, this is an exploded view of the breech block assembly, indicated in its entirety by the numeral 43. The breech block 43 includes two pivoted parts, the front breech block member 297 and the rear breech block member 298, these being mounted with a limited pivotal movement with respect to each other.

The front breech block member 297 has a forward partially cylindrical part 299, with a plane circular end 300 which is adapted to engage behind the cartridge. This cylindrical part has a through bore which may be tapered toward the front, and substantially rectangular at 301; but it terminates in a small cylindrical bore 302 at the face 300, for guiding and housing the pointed cylindrical end 303 of the firing pin 304.

The inwardly enlarged slot 301, communicating with the firing pin 302, permits the pivotal movement of the front breech block member 297 on the firing pin 304 and rear breech block member 298. The forward end of the member 299 has a depending rectangular body 305, which is provided with a pair of laterally projecting locking flanges 306.

The locking flanges 306 are adapted to slide above the bed 133 of the receiver, and below the surface 138 in the slot (Fig. 12) 141. The length of the locking flanges 306 from front to back is less than the front to back recess 111, Figure 20, so that the front breech block member 297 may have its locking flanges 306 moved downward into the recess 111, when it reaches this forward position.

In this downward position, which is shown in Figure 7, the rear ends 143 of the locking flanges 306 on the front breech block member 297 engage the shoulders 142, Figure 20, Figure 7. It is the rear ends 143 of lugs 306, engaging the forwardly facing shoulders 142 which holds the cartridge in its chamber during the firing, and these shoulders resist the reaction from the explosion.

The small pin 308, Figure 23, which projects from the body 305, is provided to prevent the cartridge from catching underneath the round end of the forward breech block member 297.

Underneath the body 305 and flanges 306 there is a longitudinally extending centrally disposed slot 309 (Figure 23) for passing the extractor. The forward part 297 of the breech block has a pair of vertically extending parallel flanges 310, 311 at its rear end, and these flanges each have a lower rectangular slot 312 at their juncture with the round part 299.

The slots 312 are adapted to receive the opening cam 313, lower right, Figure 23. Opening cam 313 has a flat body 314, which fits in the slot 315 of the breech block member 297. The flat body 314 has a larger transversely extending flat body 316 at its lower end, which is substantially rectangular and projects forwardly and laterally from the body 314, and fits in the slots 312.

The transverse rectangular body 316 has a thinner and lower forwardly projecting ledge 317, and a pair of laterally projecting trunnions 318. The body 314 also has the front-to-back through hole 319, which is oval to pass the firing pin and permit upward and downward movement of the breech block member 297 with the front end of the firing pin, while the rear end of the firing pin stays at the same level.

At its upper end the opening cam 313 has a pair of upwardly actuating fingers 320. These are adapted to engage the T-shaped front end 321 of the breech block link 322 (see top, Figure 23). When the breech block link 322 is pulled back the T-shaped end 321 pulls back on the fingers 320, tilting the opening cam 313 counter-clockwise on the trunnions 318.

Trunnions 318 engage the bed 133 of the receiver and thus the flange 317 is raised, engaging the flat bottom 323 of the front breech block member 297 to lift the locking lugs 306 out of the recess 111, Figure 20.

The opening cam 313 is held in assembly with the breech block member 297 by means of a small spring 324 (Figure 7) having its forward end in a horizontal bore 325, above the slot 309, and having its upwardly turned rear end in a vertical bore 326 in the lifting cam 313.

The tops of the parallel flanges 310, 311 are provided with the upwardly open triangular slots 327. The rear edges of the slots 327 are to be engaged by the laterally projecting lugs 328, on breech block link 322, after the opening cam 313 has been tilted to start the breech block, so that the link 322 may complete the lifting of the breech block from the lower position of Figure 7 to an upper position like that of Figure 12, although at this time the breech block is farther forward than shown in Figure 12.

The front laterally projecting lugs 353 engage the forward edges of slots 327 to push the front part 297 of the breech block downward after the lugs 347, on the rear part, have struck part (Fig. 7) 128 on the hammer housing, stopping the forward motion of the rear part 298. The action of this pivotal movement of the front part of the breech block is to move it down behind the cartridge with a minimum amount of friction, and to move the breech block locking lugs in front of the lug seats 142, Figure 20, on the receiver.

At its rear bottom the parallel flanges 310, 311 are joined by a laterally extending pivot bridge 329, shown in dotted lines in Figure 23. This pivot bridge 329 is adapted to receive the downwardly open slots 330 in the parallel flanges 331, 332 of the rear breech block part 298, Figure 23.

The front breech block 297 pivots on the rear part 298, on the bridge trunnion 329, and the parallel flanges 331, 332 on the rear part are adapted to be received between the parallel flanges 310, 311 of the front part in the slot 315. The breech block link 322 has its forward flat body portion 333 slidably mounted between the flanges 331, 332 of the rear block part 298.

The parallel flanges 310, 311 have lower flat edges 334 and rearwardly extending tails 335, which engage flatly against the top faces 336 on the lower flat body 337 of the rear part 298. Engagement of edges 334 and upper faces 336 limits the pivotal movement of the front part 297 in an upward direction, this being the position in which all of the guide lugs sliding on the receiver are substantially in alignment with each other.

The parallel flanges 310, 311 also have a pair of laterally projecting guide lugs 338, which like the front locking lugs 306 are adapted to ride on the floor or bed of the receiver for forward and rear sliding movement.

The rear breech block part 298 has the lower flat body 337, which carries the parallel flanges 331, 332, and the body 337 has a depending lug 339 (Figure 23) behind the slots 330. Lug 339 has a rounded pivot face 340 for engaging the bridge 329. The flat body 337 extends rearwardly, and has two upwardly extending parallel flanges 341, 342 with upwardly open slots 343.

These upwardly open slots 343 are adapted to receive the transverse flange 344 on the extractor 345, Figure 23. Thus the extractor 345 must move backwardly and forwardly with the breech block, but it has a pivotal movement in the slots 343 as bearings.

The parallel flanges 341, 342 are each provided with a laterally projecting guide lug 346 for riding on the receiver floor 133. At its rear end the rear breech block part 298 has a pair of depending rectangular lugs 347 that engage behind the upwardly projecting part 128 (Figure 22) which is carried by the forward end of the lock housing 127.

It is these depending lugs 347 engaging the rear of part 128, Figure 7, that stop the breech block in its forward movement, so that the rear part 298 is stopped while the front part 297 pivots downward behind the cartridge under the application of force to the top of the breech block by the action rod.

The bottom plate 337, of the rear breech block part 298, extends from front to back, joining the parallel flanges 331, 332 and 341, 342, and the space between the flanges 341, 342 is adapted to receive the rearward and thicker part 348 (Figure 23) of the breech block link 322.

Referring now to the breech block link 322, Figure 23 (top) the main purpose of this breech block link is, when pulled back to tilt the opening cam 313 counterclockwise and start the lifting and opening of the breech block, and thereafter to draw the breech block itself backward.

The breech block link 322 has a generally triangular shape in side elevation, so that it is deep enough in its rearward portion 348 for the relatively deep slots 349, 350, which are open at the top.

Its front narrow body portion 333 has a downwardly open bottom slot 351, substantially midway between the ends of the link 322. Slot 351 receives an upwardly extending finger 352 on the firing pin 304, Figure 23. This finger 352 withdraws the firing pin so that it does not project from the face 300 at aperture 302, whenever the link 322 goes backward.

The downwardly open slot 351 on link 322 has a front and rear clearance with respect to finger 352 on the firing pin, so that the link 322 may move forward and lock the breech while leaving the firing pin backward. The firing pin is thus left in position to be struck by the hammer, and in such a position that it does not protrude into engagement with the cartridge until struck by the hammer.

The slot 350, in the body 348 of the link 322, is for engagement with the extractor yoke 344 in the slot 354. The length of the slot 350, from front to back in the link 322, is sufficient to permit a lost motion between these parts. The purpose of this lost motion is to permit the link 322 to move forward, completing the locking of the breech block after the extractor 345 has been moved fully forward, so that the link may pivot the front block part downward.

On the reverse motion of the link 322, the front face or shoulder in slot 350 engages the ejector yoke 344 and pulls the ejector back, but only after the breech block has been unlocked by being started upward by the cam 313, and being pulled further upward by the lateral lugs 328 on link 322, engaging the rear edge of slots 327.

The upper slot 349, in the link 322, is for receiving laterally projecting lug 355 on the breech block handle 293. Lug 355 of the handle fits in the slot 349 of the link 322, where it is held by a spring 356. The end 357 of the spring 356 goes into a longitudinally extending bore 358 (Figure 7) in the handle 293, Figure 23.

Spring 356 is U-shaped, and its other forwardly extending leg is inwardly turned at 359 and adapted to extend into a transversely extending bore 360, located on the rear side of the link 322 (Figure 23). Thus the spring 356 prevents the rear end of the handle 293 from being removed.

The link 322 also has on both sides a laterally projecting guide flange 361, which rides on the top parallel edges 362 of the parallel flanges 341, 342 of the rear breech block part 298 (Figure 23), bottom. Thus the guide flanges 361 hold up the rear end of the link 322, the forward end of which slides in the slots 327 of the breech block member 297.

At its rear end the link 322 has a pair of depending guide flanges 363, with a slot 364 between them for receiving the thin rear end portion 365 of firing pin 304 to guide the firing pin.

The firing pin 304 has at its right end the small cylindrical end 303, which is slightly rounded, to engage the primer by extending through the small hole 302 in face 300 of the breech block. The firing pin tapers toward this front end 303, and at its rear end has a flat body 366, with the upwardly extending lug 352 engaging in the slot 351 of the link 322.

At its rear end the firing pin is reduced in thickness at 365 to be guided between the flanges 363 of the link 322. When the breech block is in the position of Figure 7, the thin rear end portion 365 (Figure 23) projects from the block to be engaged by the hammer at its rear end 367.

The extractor 345 has a pair of parallel flat legs 368 joined at the back by the flat yoke 344. The slot 354 prevents lateral motion of the extractor at this end. The yoke 344 not only extends into the slot 350 in the link, but it extends into the slots 343 on the rear block part 298.

Toward the front end of the extractor 345, the flanges 368 are thickened toward the top at 369, because they are made thinner toward the bottom, and the additional thickness at the top gives sufficient strength. At the front end the extractor 345 has a transverse yoke 370, the lower edge of which is provided with a circular groove 371, beveled at 372 to fit a groove in a cartridge.

The grooves in the cartridge are forwardly beveled and rearwardly abrupt, fitting the yoke 370. The yoke 370 and the forward parts of the parallel flanges 368 are cut down at the top at 373 to get under the receiver top. Extractor 345 carries a cartridge support 374 (Figure 23) which fits in between the flanges 368 of the extractor from the lower side.

Cartridge support 374 has a U-shaped rear yoke 375, which fits between the beveled thin portions 376 of the extractor. The yoke 375 has two forwardly extending arms 377, which engage the lower edges 378 of the extractor, and extend forwardly therefrom to carry a pair of depending curved fingers 379.

These fingers 379 permit the lower curved surface of the cartridge to react against them when the ejector takes hold at the top of the cartridge groove. The U-shaped yoke 375 of the cartridge support 374 is inserted in the ejector 345 upwardly just behind the rearwardly facing shoulders 380, and the yoke carries a forwardly extending strip 381 which engages the top of the round part 299 of the forward block member 297, to keep the cartridge support 374 from tilting downwardly.

The cartridge support 374 goes over the round part 299 of the breech block, and the ejector 345 fits over the top of the cartridge support. The cartridge support 374 and ejector 345 are urged toward each other by a double U-shaped spring 382, the middle yoke of which engages the groove 383, under the forwardly extending top strip 381.

The two V-shaped leg portions 384 of the spring extend forwardly and backwardly, and the laterally turned ends 385 of the spring engage in the grooves 386 in the top of the ejector 345. Spring 382 holds the cartridge support up, but permits it to give downwardly sufficiently for the curved lower edge 371 of the ejector to get in the top of the groove of the cartridge.

The breech block cover 387 (Figure 23) has an upper convex surface 388, and it is substantially rectangular in plan, enclosing the forward part of the receiver when the breech block is closed. Its curved top is flush with the sides of the receiver and with the top front of the receiver, and is overlapped by the cover 190, which encloses the rear end of the receiver so that the breech block cover 387 may slide rearwardly under the cover 190.

At its left side 389 (Figure 2a) the cover 387 is uniformly curved downward until its side 389 is practically flush with the side of the receiver. At its right side, however, the side flange 390 of cover 387, Figure 23, is recessed to receive the handle 293, the surface 391 of which presents a continuation of the curvature of the cover 387, like the right side.

Cover 387 is formed at its forward end (right), Figure 23, with the forwardly open slot 392 for receiving the rearwardly extending lug 393 on the handle 293. The side flange 390 of the cover 387 has a forwardly extending tongue 394 that goes under the keeper flange 395 of the handle 293, and the cover is cut back at 396 above the tongue 394 to expose the tongue and permit it to go under a complementary overhanging flange 397 on the handle 293.

The upper edge 398, on the handle 293, fits under the overhanging shoulder 399 on the cover, and the handle 293 has a laterally turned lug 355 at its rear end which fits under the projecting flange 400, at the rear end of the cover.

It has been previously pointed out how the spring 356 has one end in a hole in the handle 293, and the other end in a hole in the link 322, thus holding the handle on the cover. The handle has at its forward end a laterally projecting finger piece 401, which may be engaged by the side of the forefinger when the breech block is to be opened manually.

The breech block cover 387 has a pair of depending parallel flanges 402. These two flanges 402 are provided on their outer surfaces with the rectangular longitudinally extending slots 403, for receiving the upper guide lugs 139 (Figure 8) on the forward part of the receiver. The depending flanges 402 have plane bottom surfaces 404 which ride upon the bed 132 of the receiver, and the laterally projecting ribs 405 and 406 extend into the slots 141 of the receiver below the downwardly facing shoulder 133. Thus the cover is also mounted for sliding movement on the receiver with the rest of the breech block.

The bottom surface 407 of the cover between the depending flanges 402 is flat, and the flanges 402 are provided with longitudinally extending slots 408 on their inside tops adjacent the top inner surface 407 of the cover. This forms a longitudinally extending rectangular guide for receiving the legs 368 of the extractor 345, which may be inserted from the front of the cover 387 until the rear edge 409 of the cartridge support 374 hits the forward edge 410 of the depending flanges.

When the extractor 345 is so inserted in the cover 387, the inside of the cover presents a substantially U-shaped bottom-open slot for receiving the rest of the breech block assembly, including the front part 297, rear part 298 and link 322, the firing pin 304 passing through the assembly.

The bottom surface 404, of the breech block cover 387, has its rearward portion provided with a slot 411, with overhanging flanges 412 for receiving a retaining plate 413 (middle, Figure 23) which can be slid laterally into the slot 411 above the flanges 412.

The retaining plate 413 itself has a shallow top slot 414, into which the base or body 337 of the rear breech block 298 drops to keep the plate 413 from moving laterally after it has once been inserted. The depending flanges 402, at the forward or right end of the cover 387, have their bottom edges 404 provided with another slot 415. It provides front and rear clearance for the laterally projecting trunnions 318 on the lifting cam 313, for lifting the forward end of the block.

The clearance in the slot 415, in front of and behind the trunnions 318, permits the link to move the block backward after the cam 313 has been actuated to lift the front end of the breech block part 297.

The depending flanges 402 on cover 387 also have forwardly extending lugs 416. These are locking lugs which are provided with curved end surfaces 417, and wedging lower surfaces 418, so that they may pass forwardly above the locking lugs 306 on the front breech part 297, to lock the lugs 306 downward in front of the shoulders 325, as shown in Figure 35.

Referring now to Figure 22, this is an exploded view of the firing mechanism which will now be described in detail. The hammer housing 126 has a lower horizontal back bone 419, Figure 22, with upwardly extending legs 420 at each side of the rear. The top of these upwardly extending legs 420 carries the two rectangular hook formations 125, by means of which the rear end of the hammer housing is supported on the receiver (Figure 32) (Figure 4) in the grooves 123.

In order to make the hook formations 125 fit the receiver rear end, the legs 420 are formed with the outwardly extending offsets 421 for supporting the hooks 125, spaced sufficiently to engage the receiver walls 108, 109.

The legs 420 are joined midway between their tops and bottoms by means of a flat integral yoke 422 for strength, forming a horizontal rectangular hole 423 above the back bone 419 and below the yoke 422. At their forward edges legs 420, Figure 22, are formed with a plurality of V-shaped knife edge slots 424 for engagement with the knife edges 425, on the hammer toggle lever assembly 426.

This hammer toggle lever assembly comprises a hammer rod guide 427, a hammer rod 428 and a helical compression spring 429. The hammer rod guide 427 comprises a rectangular block of metal, which is receivable in the aperture 423, with the knife edges 425 engaging one or the other of the grooves 424. A plurality of grooves may be provided for adjusting the sensitivity of the hammer retaining toggle.

The hammer rod guide has an axial cylindrical through bore 430 for slidably receiving the hammer rod 428, which carries and guides the compression spring 429. The hammer rod 428 has a substantially rectangular extension 431, with a T-shaped end 432 having a V-shaped end groove 433 formed in the top of the T.

The rectangular extension 431 has a shallow slot 434 in its side to make room for a depending flange 435, carried by the hammer 436. Flange 435 is offset toward the side surface 437 of the hammer, the hammer being thicker than flange 435 so that the hammer may be centrally disposed in the lock housing, while the flange 435 depends into slot 434 of the hammer rod extension 431.

The spring 429 is the hammer spring, and it is guided upon the rod 428, the rod 428 sliding into the bore 430 of the hammer rod guide as the spring is compressed. At one end spring 429 seats on block 427, and at the other end it seats upon the rectangular end of the hammer rod extension 431. The groove 433 in the T-shaped end 432 of the hammer rod extension is adapted to receive the rear knife edge 439, carried by hammer 436, while the front knife edge 440 on the hammer is received in the V-shaped knife edge groove 441, on the hammer housing 126 at the forward end of the back bone 419.

The location of the knife edges 425, 439 and 440, when the hammer 436 is cocked, is such that the knife edge 439 is below the line of centers or plane of centers, extending from knife edge 440 to knife edges 425. When the hammer is raised sufficiently so that knife edge 439 passes above this plane of centers, then spring 429 urges knife edge 439 forwardly to the right, causing the hammer to move clockwise with considerable force to strike the firing pin.

Hammer 436 comprises a relatively thick body 442 supported upon a transverse pivot plate 443. Pivot plate 443 has the knife edges 439 and 440 parallel to each other at the front and rear edges of plate 443. The body 442 of the hammer has a front curved recess 444 for receiving the loading rod offset 445, which is curved to engage the hammer recess 444. The loading rod is indicated at 446, Figure 22.

The point 447 of the hammer is located radially with respect to the knife edge 440, in position to hit the end of the firing pin 304, Figure 23. The rear of the hammer 436 has an upwardly facing curved groove 448 for receiving laterally projecting finger 449 on the hammer safety 450.

At its forward end, the back bone 419 of the hammer housing is provided with an upward offset 451 below the knife edge groove 441, and the forward supporting body 452 supports the knife edge groove 441 at an elevation so that it is in substantial alignment with grooves 433 and 424. The front supporting body 452 of the hammer housing 126 has a pair of forwardly extending lugs 453 separated by a slot 454.

Lugs 453 fit in the slots 455 in the depending column 456 of the lock housing 127, Figure 22. The slot 454 receives the column 456 whereby the front end of the hammer housing 126 is secured to the front end of the lock housing 127. The lock housing 127 (Figure 22) has a pair of parallel front-to-back extending side flanges 457, 458. These are joined at the front and back by yokes, such as the upper front yoke 459 and lower front yoke 460, and the rear lower yoke 461.

The upper front yoke 459 supports the horizontal flange 128, by means of which the lock housing and firing assembly is mounted in the receiver, with the flange 128 resting upon bridge 113 (Figure 12 and Figure 9). The yoke 459 has a slot 462 in its right face (Figure 22) for receiving the bridge 113 of the receiver. The bridge 113 has slot 115 for receiving the retaining plate 128, and restraining it against lateral motion.

At the forward end of the lock housing 127 there is a rectangular aperture 463 between the flanges 457, 458 for passing the loading rod 446. The top of the left flange 457, of the lock housing 127, is cut away at 464 to receive the loading rod flange 465, and the loading rod catch 466 that is carried by this flange.

When the catch 466 is assembled with flange 465, they both ride on the base of slot 464 so that the loading rod is flush with the top of the lock housing 127. The other parallel flange 458 is cut away throughout its length to be of the same height as the base of the slot 464, so that the bottom 467 of the loading rod 446 can rest upon and slide upon the top of flange 458.

The slot 464 has a bevel at 468 on its rear or left edge, the bevel extending rearwardly and inwardly for moving the loading rod catch 466 into engagement with the operating rod. The flange 465 on the loading rod has an aperture 469 for receiving an integral pin 470, carried by the upper side of the loading rod catch. The loading rod catch comprises a flat metal member 466 (Figure 22) having an actuating tail 471, with a beveled end 472 adapted to be cammed clockwise in Figure 22, by the beveled surface 468 on the lock housing 127.

Loading rod catch 466 is mounted in a lateral slot 473 in the loading rod 446, and its counterclockwise motion is limited by its edge 474 engaging the base of that slot. This stop surface 474 prevents the catch 466 from moving counterclockwise (Figure 22) to any position where the beveled end 472 could get outside of the beveled surface 468 on the lock housing 127.

At its right end, loading rod catch 466 has a forwardly and laterally extending hook 475, with a retaining shoulder 476 for engagement with the operating rod. The loading rod catch 466 has a laterally extending arm 477, which extends toward the left and has an upwardly extending lug 478.

This arm 477 is adapted to be engaged by the ejector, and moved backwardly to draw the catching shoulder 476 out of engagement with the action rod when the loading rod has gone forward far enough to push the cartridge from the magazine. The loading rod then stays there to prevent other cartridges from rubbing on the breech block as it opens and closes.

The parallel flanges 457 and 458, of the lock housing 127, become deeper from top to bottom at the rear or left end of the lock housing 127, Figure 22. The forward edge of these depending flanges 479 is provided with a narrow slot 480, at the top front, to receive a retaining spring 481 (top, Figure 22) which also is the extractor spring.

The rear edge of flanges 479 have a transverse slot 482 for receiving the safety in one of them. The top of these rear flanges 479 is joined by a horizontal yoke 483. This yoke has a top and rear groove 484 for the trigger spring 485. The spring 481 is substantially U-shape in plan, having a transverse horizontal yoke 486 which passes rearwardly of the upwardly extending flanges 420 on the hammer housing, and is in position to snap into the forwardly open groove 480 on the lock housing 127, when these two parts are assembled.

Spring 481 has a right forwardly extending leg 487, which passes over a horizontal retaining flange 488 on the hammer housing 126, and it has a rearwardly extending leg 489 carried by a back bend 490, the leg 489 being located in the slot 491 of the hammer housing 126. Thus the end 489 of the spring 481 is arranged to resist downward movement of the left leg 492 of this spring, and the left leg 492 is urged upwardly.

This left leg 492 has a laterally inwardly turned end 493. The spring 481 having been mounted on the hammer housing 126, the latter may be assembled with the lock housing 127 by placing the lugs 453 in the forward slots 455 of the lock housing 127 first. Then the rear ends of members 127 and 126 are pivoted toward each other until the yoke 486 of the spring, carried by hammer housing 126, snaps into the groove 480 on the lock housing 127.

During this movement the hammer 463 has been located between the parallel flanges 457, 458 of the lock housing. The loading rod 446 has a T-shaped pusher end 494 carried by a thin rectangular shank 495, which is small enough so that it can be rotated in the rectangular aperture 456 during the insertion of the T-shaped end 494.

At its rear end the rectangular shank 495 has the offset 445, which is integrally secured to the rectangular body portion 496, and which maintains the curved offset 445 centrally located between the flanges 457 and 458 to be engaged by the recess 444 of hammer.

The body 496, of the loading rod 446, is offset sufficiently so that it slides on the top of the flange 458, and this body carries the laterally projecting flange 465 for pivotally mounting the loading rod catch 456. The body 496 is provided with an offset 497 at the front of flange 465, and this offset has a depending guide portion 498 located to slide between the flanges 457 and 458.

There is a slot 473 for the loading rod catch extending laterally into the guide body 498 below the flange 465. At its rear end the loading rod has an upward offset 499 supporting a rearwardly extending T-shape formation 500. This T-shape formation 500 extends horizontally, and the shoulders 501, below the top of the T, are adapted to engage depending lugs on the rear end of the breech block, these being the depending lugs 347, of Figure 7, which also stop the forward movement of the breech block.

The trigger lock 502 is shown in the lower left of Figure 22, and it is adapted to be located in the position shown between the thick flanges 479, at the left end of the lock housing 127.

This trigger lock 502 has a flat vertical body 503, and at its upper end a rearwardly extending lug 504, which extends laterally at 505 and forwardly at 506, forming a front open hook to be slidably received in the slot in the thick flange 479, which is on the right side. At the bottom of the flat body 503 there is a horizontal offset 507, toward the right (Fig. 22), which supports a depending finger 508, having a laterally turned end 509.

This laterally turned end 509 is to be engaged by the thumb only in setting and releasing the trigger, and projects downwardly from Fig. 1, where it is seen on the right side of trigger 45. The trigger safety spring is shown at 510 (Fig. 22). It has two depending legs 511 and 512, carried by a top yoke 513.

The trigger safety spring 510 is inserted from the top, its backwardly extending U-shaped bend 514 being in the upwardly and rearwardly open slot 484 of the lock housing 127. The leg 512 extends downwardly to the left of the trigger safety 502, and the laterally turned end 515 extends in front of the trigger safety to be engaged in slot 516 or to ride over hump 517 to the point 518.

The depending leg 511 (Fig. 22) of the spring 510 passes in at the rear of the lock housing 127, that is, the left, in the aperture below the yoke 483 and above the yoke 461. Leg 511 depends in front of yoke 461, and has a forwardly turned end 519 for engagement with the trigger.

The trigger 520 comprises a T-shaped member, having the shank 521 of the T extending horizontally and comprising a flat horizontal flange. At the juncture of the T the body is thickened and provided with a horizontal hole 522. The top of the T, which extends vertically in Figure 22, comprises a rectangular bar 523 and a depending curved finger engaging member 524. The latter is curved on its front surface 525 to keep the finger from slipping off, and is beveled on its rear lower edge 526 to remove the sharp corner and permit the finger to slide over to the front side.

The upwardly extending leg 523 is provided with a longitudinally extending slot 527 on its rear or left side, Figure 22, which communicates with an inwardly extending cylindrical bore 528, located in the slot 527 at a point past the hole 522. The bore 528 is adapted to receive the laterally turned end 519 on the leg 511 of spring 510, and constitutes the pivotal support for the trigger 520, at the rear end of the trigger.

The horizontal leg 521 of the trigger is provided at its forward left edge with an upwardly extending flange 529, which rides on the left side of the back bone 419 of the hammer housing 126. The upwardly extending flange 530 on the right side of the horizontal leg 521 rides on the right side of the back bone 419, and has a rearwardly open horizontal slot 531 for engaging a laterally projecting pin 532, on the back bone 319 of the hammer housing 126.

The depending pin 533 on the hammer housing 126 engages in front of the base of slot 534, when the parts are assembled, and prevents the trigger 520 from sliding forwardly far enough to get off the pin 532. The assembly of these parts is as follows:

The trigger safety 502 is first inserted in the bottom left end of lock housing 127 between the flanges 479. The hook formed by flange 506 rides on the outside of the right flange 479 in the slot 482. The offset 507 on safety 502 brings the depending flange 508 to the right of the trigger.

The spring 510 may then be inserted from the top with leg 512 in front of yoke 483 and leg 511 in front of yoke 461, and the laterally turned end 515 engages in front of depression 516 in the safety 502. The corner 535 of the safety 502 is adapted to engage the stop shoulder 536 on the trigger when the safety is down. This prevents the trigger from sliding backwardly.

When the safety is up the shoulder 535 is above the shoulder 536, permitting the trigger to slide. The depending leg 512 of the spring holds the safety in either of these positions by means of its laterally turned end 515, and the spring is seated in the slot 484 of lock housing 127.

The trigger may now be inserted to the left of the trigger safety 502, with the vertical bar 523 engaging behind the body 503, in Figure 22. The left leg 511 of the spring 510 then extends down the slot 527 in the back of the trigger, with its end 519 in the hole 528.

Before inserting end 519 into hole 528 the front end of the trigger must be placed against the bottom of the back bone 419, with the pin 532 inserted in the slot 531 for sliding movement. The back of the trigger is then pivoted upward until the spring end 519 goes into hole 528, holding the rear end of the trigger upward for sliding movement.

The ejector 537 is seen in perspective at the top of Figure 22. It has an elongated horizontal body consisting mainly of the vertical flanges 538 and 539, which slide on the left side of the trigger and hammer assembly, these flanges engaging the left faces of the loading rod body 496. Between the vertical flanges 538 and 539 there is an integral rectangular bar 540, which has a horizontal aperture 541. This is to receive the inwardly turned end 493 of the ejector spring 481, upon which the ejector 537 is pivoted.

The front end of the ejector, right, Figure 22, has an upwardly extending diagonal flange 542, and behind the flange there is a top-open slot 543 that receives the bridge 113 of the receiver. The right edge of the flange 542 has a slot 544 through which the loading rod end portion 495 extends when the parts are assembled.

The flange 542 also supports at its lower edge a rearwardly extending finger 545, which extends into the rectangular opening 463 of the lock housing 127 as a guide. Beside the finger 545 there is a rearwardly open slot 546, which receives the right-hand flange 458 of the lock housing 127.

At its rear end the ejector lever 537 has the vertically extending flange 538, and there is a slot 547 in front of the rear vertical flange 538 and behind the front flange 539. The flange 538 has a forwardly extending pointed finger 548 overhanging the open slot 547, and this overhanging lip is used to force the front end of the extractor up to eject the shell when the rear end of the ejector lever is moved downward.

The loading rod 446, when projected forward in the position of Figure 7, keeps the cartridges from coming up and is latched there by an inwardly extending lug 549 on the ejector lever, engaging behind the left end of the loading rod 446. To insert the locking trigger mechanism in the receiver, it is necessary to remove the end 493 of spring 481 from the hole 541, resting this spring above the ejector to hold it in place.

The supporting flange 128 on the lock housing 127 is then inserted over the bridge 113, and the hooks 125 at the top of the hammer housing 126 are moved forwardly on the rear end of the receiver into the slots 123, Figure 4. The ejector lever 537 eventually holds the locking mechanism assembly on the bridge 113 by coming up from below with its slot 543, and engaging the bridge 113 on the bottom, front and back; hence the reason for releasing the ejector lever from its spring during the assembly of the locking mechanism with the receiver.

This having been accomplished, the ejector lever is then pivoted upward at its front end to engage in front of, below and behind the bridge 113, and the end 493 of spring 481 is moved into hole 541 of the ejector lever to hold the ejector lever in this position. During all this time the trigger should be in cocked position.

Hammer lifter 450 is shown at the bottom of Figure 22. The back bone of the hammer housing has a slot on its right side comprising the elongated slot 550, in back bone 419 of hammer housing 126. This slot has a horizontal pin 551. The hammer lifter 450 has a bottom opening and a slot 552 engaging over the horizontal pin 551.

The hammer lifter 450 has a flat lower plate 553, an offset 554 toward the right and a flat upper plate 555. The offset 554 brings the upper plate 555 out beside the hammer rod, while the lower plate is located in the same plane as the depending lifter flange 435 on hammer 436.

The lower plate 553, of the hammer lifter 450, has a forwardly extending lug 556, the upper edge of which engages under the end 557 of the hammer lifter lug 435. When the hammer lifter 450 pivots counterclockwise the lug 556 engages bottom 557 of flange 435, and lifts the hammer 436 past dead-center to release it for engaging the firing pin.

The hammer lifter 450 has its upper plate provided with a forward hook-like extension 558, which has a laterally extending flange 449 adapted to engage in the hook-like depression 448 on the back of the hammer. This is a hammer safety 449, which prevents the hammer 436 from being jarred past dead center, unless it is actually lifted by the lifter 450.

The counterclockwise motion of the lifter 450, which causes lug 556 to lift the hammer, also causes the hook flange or safety flange 449 to move toward the left out of the depression 448 so that the hammer can move when it is released.

The trigger extension 559 is shown at the lower right of Fig. 22, and it is adapted to operate the lifter 450 by means of the trigger. It comprises a strip of metal, such as steel, having a straight horizontal portion 560 at its rear end provided with a laterally projecting cylindrical pin 561.

The pin 561 is inserted into the hole 522 in the body of the trigger 520 and extension 559 is supported for pivotal movement on a horizontal axis. Forwardly of the horizontal straight portion 560 there is the diagonally forward and upward extending portion 562, which carries on its left side a rectangular depending flange 563. Flange 563 is received in the rearwardly open slot 564 in the horizontal part 521 of the trigger 520.

The diagonally and upwardly extending part 562 of the trigger extension has an upwardly open rectangular slot 565, and this is adapted to receive the horizontally projecting flange 566 on the hammer lifter 450. The trigger extension thus engages the hammer lifter 450 in such manner that it keeps the hammer safety flange 449 forward.

The front shoulder on slot 565 serves to permit the trigger extension to pull the hammer lifter backward or counterclockwise. The trigger extension is held upward by a U-shaped spring 567, Figure 4. One upwardly turned end of this U-shaped spring extends into the downwardly open bore 568 in trigger extension 559, Figure 4. The other lower leg of the spring 567, Figure 4, hooks over the trigger forward of lug 530, and has its inwardly turned end 569 hooked behind shoulder 570, on trigger part 520.

The trigger extension disconnector 571 is shown at the lower right of Figure 22. It comprises a U-shaped steel lever on the right side of the hammer housing, having a horizontal pin 572 carried by its right leg 573 for insertion into a hole 574 in the front end or lug 453 of hammer housing 126. The disconnector 571 extends upward at leg 573, horizontally at its yoke 575 and downwardly at its other leg 576. Its rear lower end 577 engages the forwardly extending finger 578 on the trigger extension 559.

The operating rod 165, Figure 21, has a flat lower surface 579 at its rectangular portion, and it has a beveled surface 580 at its extreme rear end. There is a shoulder 581 between these two lower surfaces. The flat lower portion 579 engages the top of the yoke 575 of the disconnector 571 and holds it downward so that the end 577 engages the finger 578, pivoting trigger extension 559 downward in such a position that the lifter flange 566 is out of the slot 565 of the trigger extension 559.

Movement of the trigger under these conditions will not move the hammer lifter. Until the breech has been fully closed and the shoulder 581 on the action rod passes the front corner 582 on the disconnector 571, this disconnector is held downward to disconnect the trigger from the hammer lifter.

When the breech is fully closed the beveled surface 580 is located above the disconnector, permitting the disconnector to rise and permitting the trigger extension 559 to become connected with the hammer lifter 450 through engagement of slot 565 with flange 566. Thus the trigger can never be used to actuate the hammer until the breech is fully closed.

The operation of the gun is as follows: Assuming the breech block to be closed and unloaded, to load it, the magazine 44 should be filled with cartridges and inserted into the aperture 55 in the bottom of the stock. The magazine catch 58 will then hold the magazine in the position of Figure 4.

The breech block 43, which is locked in closed position by the action lock 147, should then be released by pushing downward on the upwardly projecting flange 153, on the left side of the barrel, Figure 14, and by means of the breech block handle 293 and the thumb piece 401 the breech block may be moved backward to open it and again move forward to close it to bring up the first cartridge and insert it in the muzzle.

The presence of a cartridge in the magazine hits the finger 152 on the action lock and pivots the action lock to unlock the breech block. When the breech block is pulled back it will lock open, if there is no cartridge, but if there is a cartridge it remains unlocked.

The insertion of the magazine itself with cartridges does not unlock the action lock, but by pulling the breech block back a little then the cartridge is permitted to come up and strike the action lock at the flange 152 to unlock it. When the breech block is pulled back the depending lugs 347 on the breech block engage on the opposite sides of the T-shaped formation 500 on the loading rod 446 and draw the loading rod back far enough to get the T-shaped end 494 of the loading rod behind the cartridge.

Before this the loading rod has been above the cartridge, preventing its upward movement. As the loading rod moves backward from a position above the cartridge to a position behind the cartridge, the cartridge is pushed up by the magazine spring, with the point of the cartridge tilting upward and the rear end held downward by the magazine lips 88. Thus the cartridge is pointed upward toward the muzzle of the barrel.

After the breech block has been opened, the retractor spring 255 has been tensioned and it now tends to pull the breech block forward. At it does this the loading rod 494 pushes on the rear end of the cartridge, as shown in Figure 13, pushing the cartridge out from under the magazine lips 88, and the cartridge rises above the loading rod at its rear end. This is about to take place in Figure 13.

After the cartridge rises above the loading rod it is caught in front of the breech block which continues to push the cartridge into the barrel. The cartridge is pushed by that part of the breech which is below the firing pin, the firing pin having been retracted.

In its forward movement the depending lugs 347, on the breech block, catch on the receiver bridge 113 stopping the forward movement of the breech block, but thereafter the breech block link 322 and cover 387 continue in their forward movement, engaging the top of the front part of the breech block at the forward edges of slots 327 pivoting this forward part 297 downward. This forces the face of the breech block forward and downward against the cartridge.

The breech block locking lugs 306 which at first are in line with the cartridge move downward as the front part pivots downward and slightly backward. The face 300 of the breech block is so curved that as it goes down it comes up tight against the cartridge, bringing the firing pin in line with the primer.

The lugs 306, on the breech block front part 297, are then locked in front of the lugs 142 (Figure 20) on the receiver. The cover 387 continues to move forward until the forwardly projecting lugs 416 on the cover are located above the locking lugs 306 on the breech block. The hammer is already cocked, having been left so by the last firing when the breech block came back.

The following is the sequence of events which takes place in the operation of firing the gun: The ordinary safety, which is represented by the depending flange 509, beside the trigger 45, is first taken off the safety position by moving it upward by the thumb, this safety blocks the trigger and the trigger blocks the hammer.

After the safety is taken off the trigger may be pulled, and the trigger moves backward moving the trigger extension 559 backward. The trigger extension slot 565 catches on the flange 566 on the hammer lifter, drawing the lifter back. This unhooks the lifter safety 449 from the hook 448 of the hammer and also causes the lifter hammer to pivot on its lower trunnion groove 552, engaging the depending extension 435 and lifting the hammer.

When the hammer has been lifted to such a position that knife edge 439 passes above the plane of dead-centers, between the knife edges 440 and knife edges 425, the hammer has then been released and the hammer spring 429 pushes the hammer forward against the firing pin.

The hammer point 447 strikes the rear end 365 of the firing pin 304 and the small end 303 of the firing pin strikes the primer igniting the charge.

As the gas forces the bullet out of the barrel, the bullet passes the hole 246, Figure 24, in the barrel admitting gas to the cylinder 235. The gas drives the piston forward, the forward end of the piston carrying with it the yoke 251 of the main spring housing 166.

The forward end of the main spring 221 is seated against the bracket 216, Figure 24. The rear end of the main spring 221 engages the rear yoke 258 of the main spring housing 166. As the main spring housing 166 moves forward the main spring 221 is compressed between bracket 216 and rear yoke 258.

The main spring housing 166 is driven forward until the main spring latch 262 engages in the hole 275 in the action rod, thus latching the rod and housing together for rearward movement. By that time the rear end of the piston 248 has passed the open end of the cylinder 235, and is located in the trough 247. The gas is then permitted to escape immediately upward and forward, and only a predetermined compression is placed on the main spring 221.

As the main spring went forward the action rod 165, which was latched in fixed position to hold the breech block closed, became unlatched and was thereafter free to move. Then the action spring began to expand in a rearward direction, driving the main spring housing backward and carrying with it the action rod 165 by means of latch 262 in hole 275.

The action rod is connected at the slot 291 to the breech block cover, and it moves the breech block cover backward. This backward movement of the breech block cover moves the forwardly projecting lugs 416 of the cover 387 (Figure 23) backward from their locking position over the locking lugs 306, and thereafter the front end of the breech block 297 is pivoted upward by the breech block link 322, which link moves with the cover 387.

Thereafter the lugs 328, on the breech block link 322, engage the front edges of the flanges 331 and 332 of the rear breech block part 298, drawing the entire breech block back altogether with the extractor 345.

The extractor has previously had its round lip 371 in the groove of the cartridge, and the extractor pulls the shell out as it moves with the breech block and cocks the hammer as follows:

The rear end of the breech block link hits the face 447 of the hammer and pivots the hammer back until the hammer passes dead-center. Then the hammer goes a little farther past dead-center under its own spring, moving out of engagement with the breech block, thus reducing the friction as the breech block continues backward.

As the breech block goes back the lugs 347 strike the rear top end of the ejector lever 537, forcing it down past the loading rod and unlocking the loading rod. The bottom extensions 347 on the breech block then catch the loading rod at the shoulders 501, and draw the loading rod to the rear. As the loading rod is drawn to the rear the latch 466 on it is forced inward at the beveled surfaces 468, 472, and the hook 476 on the latch is forced out to engage a notch 294 in the action rod.

As the shell is pulled out by the breech block it is carried back until it is located with the cartridge in front of the ejector. As the breech block forces the back end of the ejector down it tips the front end with the diagonal flange 542 upward to throw the cartridge shell up.

As the breech block starts to open, the action rod 165, Figure 21, engages the top of the disconnector 571 which engages the trigger extension 559, forcing it down with its slot 565 out of engagement with the flange 596 of the lifter 450. Slightly before the end of the rearward movement of the main spring housing 166, the point of the action rod latch 262 strikes a pin which forces the latch out of engagement with the hole 275 in the action rod 165.

Now the action rod has been disconnected from the main spring housing, and the retractor spring, which is weaker and has been tensioned by the main spring, comes into play to close the breech block which has become disconnected from the main spring.

As the breech block starts its backward movement the breech block link 322 has a notch 351 that engages lug 352 on the firing pin to retract the firing pin immediately. keeping the firing pin back in the breech block part 297. In the final locking action of the breech block the breech block link 322 moves forwardly enough for its notch 351, which has a clearance, to move away from and free the lug 352 of firing pin 304.

As the hammer has moved past dead-center in being cocked, the bottom of the hammer, comprising the depending flange 435, has come into contact with the lug 556 of the lifter 450, Figure 22, which moves clockwise and moves the safety flange 449 of the lifter into the slot 448 of the hammer 436. The trigger spring pushing forward keeps part of the lifter in the notch 448 when the trigger is at rest.

It should be noted that the loading rod 446 is pulled backward by the breech block when the breech block goes back. As the action rod starts forward again the loading rod latch 466 is engaged in a notch 294 in the action rod. When the loading rod has gone forward far enough to push the cartridge from the magazine into the barrel, the arm 477, on the opposite side of the loading rod catch, strikes the ejector 537 at the front edge of the slot 547, withdrawing the catch 466 from engagement with the action rod. Then the loading rod stays there in a forward position to prevent other cartridges from rubbing on the breech block as it opens and closes.

When the breech block pushes on the back end of the extractor, it forces the front end of the extractor upward by reason of the spring 382 to engage the cartridge. As the breech block goes forward it goes over the center pivot of the extractor and forces the extractor down and out of the way.

As the action rod went backward it forced the disconnector 571 downward against the trigger extension 559, disengaging the trigger extension from the lifter. Thus even if the trigger is pulled it cannot fire the gun until the breech block is locked.

As the action rod goes forward to the closed position, it passes beyond the disconnector 571, and the trigger extension spring then forces the trigger extension up and connects the trigger to the lifter by means of the slot 565 engaging flange 566 on lifter 450. The trigger can then fire the gun only after the breech block has been closed.

The present gun can be adapted for clip loading. For this it is only necessary to open the breech block, shove the cartridges down out of the clip, pull the clip out of the slot in the receiver cover and throw it away. When clip loading is used the magazine is preferably arranged for a double column to let the cartridges in. In such case the receiver overlaps the cartridges and holds the cartridges in the magazine until they are pushed forwardly out of the magazine.

It will thus be observed that I have invented an improved semi-automatic firearm, and while this firearm has been embodied in a rifle it may be embodied in shotguns, pistols or other types of firearms.

The present rifle has the following salient advantages:

A. It can be cleaned from the breech by removing the breech block in the way in which it should be cleaned for the following reasons:

(1) Rifling is worn by the rod if cleaned from the muzzle.

(2) If the barrel is cleaned from the breech, and the rifling is already slightly tapered to seat the bullet, the rod cannot damage the cartridge chamber which is an enlargement of the barrel.

B. The present gun has its breech block and loading mechanism actuated by means of a main spring, which is compressed only to a predetermined amount regardless of the strength of the primer or the strength of the charge. This results in a uniform force exerted upon the breech block and other mechanism to eject and reload, and is desirable for the following reasons:

(1) Too much force from a heavily charged shell may damage the parts in the devices of the prior art.

(2) Too little force from an undercharged shell or old primer may result in imperfect loading or imperfect ejection.

C. All the excess gas not needed for compressing the spring this predetermined amount is immediately released upwardly and forwardly away from the user.

D. The present device will never fail to eject and never fail to load.

E. The breech cannot be opened by mishandling, such as a downward jar on the stock.

F. The action rod will not fail to work even when the gun is held loosely in the hand, nor will it fail to work when the gun is pointed downward or upward.

G. By means of the spring compressed to a predetermined tension, the gas actuated action rod does not vary in force with shells of different size or weak primers.

H. There is no backwardly discharged gas nor any piston rod which needs to be packed, and which introduces friction to reduce the action of the gases.

I. The breech block moves with a minimum amount of friction, and with a smoother action since it does not have to stop to be turned, but moves forward and downward where it is locked against the cartridge.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an improved structure for securing the breech of a firearm barrel to a stock, the combination of a barrel and a stock, the barrel being pivotally mounted on the stock, and a toggle link extending from a point on the stock behind the pivotal mounting of the barrel to a point on the barrel in front of the pivotal mounting on the barrel, said link being tightened in tension as the barrel has its forward end pivoted downward on the stock until the link passes dead center.

2. In an improved structure for securing the breech of a firearm barrel to a stock, the combination of a barrel and a stock, the barrel being pivotally mounted on the stock, and a toggle link extending from a point on the stock behind the pivotal mounting of the barrel to a point on the barrel in front of the pivotal mounting on the barrel, said link being tightened in tension as the barrel has its forward end pivoted downward on the stock until the link passes dead center, the said link having a pair of legs, and the barrel having a receiver with upwardly open side walls, each of said legs having its forward pivotal engagement located in a groove in the top of said side wall.

3. In an improved structure for securing the breech of a firearm barrel to a stock, the combination of a barrel and a stock, the barrel being pivotally mounted on the stock, and a toggle link extending from a point on the stock behind the pivotal mounting of the barrel to a point on the barrel in front of the pivotal mounting on the barrel, said link being tightened in tension as the barrel has its forward end pivoted downward on the stock until the link passes dead center, the pivotal mounting of said barrel on said stock being by means of a pair of rearwardly open bearing grooves, and a metal member carried by the stock and having a pair of forwardly extending trunnion flanges in said grooves.

4. In an improved structure for securing the breech of a firearm barrel to a stock, the combination of a barrel and a stock, the barrel being pivotally mounted on the stock, and a toggle link extending from a point on the stock behind the pivotal mounting of the barrel to a point on the barrel in front of the pivotal mounting on the barrel, said link being tightened in tension as the barrel has its forward end pivoted downward on the stock until the link passes dead center, the pivotal mounting of said barrel on said stock being by means of a pair of rearwardly open bearing grooves, and a metal member carried by the stock and having a pair of forwardly extending trunnion flanges in said grooves, the said trunnion flanges also having rearwardly extending portions with rearwardly facing grooves forming bearings for trunnions carried by the rear end of said link.

5. In an improved structure for securing the breech of a firearm barrel to a stock, the combination of a barrel and a stock, the barrel being pivotally mounted on the stock, and a toggle link extending from a point on the stock behind the pivotal mounting of the barrel to a point on the barrel in front of the pivotal mounting on the barrel, said link being tightened in tension as the barrel has its forward end pivoted downward on the stock until the link passes dead center, and a barrel encircling member carried by the forward end of the barrel and having a part extending downwardly through a hole in the stock, and wedging means for drawing said member downwardly toward the stock.

6. In a firearm, the combination of a stock with a barrel, said barrel being pivotally mounted on the stock against the breech of said barrel, a toggle link operating between the stock and the barrel and drawing the barrel downwardly and backwardly as the barrel is pivoted toward the stock at its forward end, and wedging means between the forward end of the barrel and the stock for holding the barrel to the stock at its forward end.

7. In a firearm, an improved structure for securing a barrel to a stock, comprising a stock having an arm engaging portion and a forward portion adapted to be mounted under the barrel of a gun, and a gun barrel mounted on said stock, said stock being formed forwardly of the arm engaging portion with a top-open recess for receiving the barrel and having a transverse thrust receiving end surface, said barrel being formed with a rearwardly facing open half bearing, a half trunnion carried by a metal member based on said transverse surface and engaging in said half bearing, and a toggle link pivotally secured at its rear end on said metal member behind said trunnion and pivotally engaged on the barrel forwardly of said open half bearings, whereby the stock, barrel, and link may be assembled with the forward end of the barrel elevated from the stock, and the barrel may be drawn down toward the forward end of the stock to cause the forward and rear points of pivot to have their line of centers pass the axis of said trunnions to secure the rear end of the barrel assembly to the stock.

8. In a firearm, an improved structure for securing a barrel to a stock, comprising a stock having an arm engaging portion and a forward portion adapted to be mounted under the barrel of a gun, and a gun barrel mounted on said stock, said stock being formed forwardly of the arm engaging portion with a top-open recess for receiving the barrel and having a transverse thrust receiving end surface, said barrel being formed with a rearwardly facing open half bearing, a half trunnion carried by a metal member based on said transverse surface and engaging in said half bearing, and a toggle link pivotally secured at its rear end on said metal member behind said trunnion and pivotally engaged on the barrel forwardly of said open half bearings, whereby the stock, barrel, and link may be assembled with the forward end of the barrel elevated from the stock, and the barrel may be drawn down toward the forward end of the stock to cause the forward and rear points of pivot to have their line of centers pass the axis of said trunnions to secure the rear end of the barrel assembly to the stock, the said structure including two such half bearings, two such trunnions, and duplicate connections at each end of said link on each side of the barrel, whereby both sides of the barrel are drawn backward and downward toward the stock.

9. In a firearm, the combination of a rifle barrel and a stock to be secured to the rifle barrel adjacent its forward end, with a compression spring mounted longitudinally under said barrel, a securing band member extending about the barrel and arranged to resist the reaction of said spring at its forward end, and a wedging member slidably mounted on said band member, said wedging member being engaged by said spring and urged into wedging position, and having a forwardly extending wedging hook passing through an aperture in the stock, said wedging hook engaging in a part carried by a retainer plate located on the lower side of the stock, the wedging hook being reciprocable against the spring compression into position to be engaged by the part on said plate, the spring urging said hook forwardly to draw the barrel tightly to the stock.

10. In a firearm, the combination of a rifle barrel and a stock to be secured to the rifle barrel adjacent its forward end, with a compression spring mounted longitudinally under said barrel, a securing band member extending about the barrel and arranged to resist the reaction of said spring at its forward end, and a wedging member slidably mounted on said band member, said wedging member being engaged by said spring and urged into wedging position, and having a forwardly extending wedging hook passing through an aperture in the stock, said wedging hook engaging in a part carried by a retainer plate located on the lower side of the stock, the wedging hook being reciprocable against the spring compression into position to be engaged by the part on said plate, the spring urging said hook forwardly to draw the barrel tightly to the stock, said wedging hook having a part projecting forwardly from the end of the stock for engagement in actuating the hook backwardly against the spring, to release the barrel from the stock.

11. In a firearm, the combination of a rifle barrel and a stock to be secured to the rifle barrel adjacent its forward end, with a compression spring mounted longitudinally under said barrel, a securing band member extending about the barrel and arranged to resist the reaction of said spring at its forward end, and a wedging member slidably mounted on said band member, said wedging member being engaged by said spring and urged into wedging position, and having a forwardly extending wedging hook passing through an aperture in the stock, said wedging hook engaging in a part carried by a retainer plate located on the lower side of the stock, the wedging hook being reciprocable against the spring compression into position to be engaged by the part on said plate, the spring urging said hook forwardly to draw the barrel tightly to the stock, the said spring being the main spring provided wtih a reciprocating frame and adapted to open the breech after the firing of a shot.

12. In a firearm, the combination of a rifle barrel and a stock to be secured to the rifle barrel adjacent its forward end, with a compression spring mounted longitudinally under said barrel, a securing band member extending about the barrel and arranged to resist the reaction of said spring at its forward end, and a wedging member slidably mounted on said band member, said wedging member being engaged by said spring and urged into wedging position, and having a forwardly extending wedging hook passing through an aperture in the stock, said wedging hook engaging in a part carried by a retainer plate located on the lower side of the stock, the wedging hook being reciprocable against the spring compression into position to be engaged by the part on said plate, the spring urging said hook forwardly to draw the barrel tightly to the stock, the said band member also supporting a cylinder closed at its rear end and engaging the lower side of the barrel and communicating with the barrel through a transverse aperture adjacent its lower end.

13. In a firearm, the combination of a rifle barrel and a stock to be secured to the rifle barrel adjacent its forward end, with a compression spring mounted longitudinally under said barrel, a securing band member extending about the barrel and arranged to resist the reaction of said spring at its forward end, and a wedging member slidably mounted on said band member, said wedging member being engaged by said spring and urged into wedging position, and having a forwardly extending wedging hook passing through an aperture in the stock, said wedging hook engaging in a part carried by a retainer plate located on the lower side of the stock, the wedging hook being reciprocable against the spring compression into position to be engaged by the part on said plate, the spring urging said hook forwardly to draw the barrel tightly to the stock, the said band member also supporting a cylinder closed at its rear end and engaging the lower side of the barrel and communicating with the barrel through a transverse aperture adjacent its lower end, said cylinder having a piston rod connected to said spring through a frame, whereby the gas passing through said aperture into said cylinder on the firing of a shot urges the piston forward to compress the spring a predetermined amount.

14. In a firearm, the combination of a rifle barrel and a stock to be secured to the rifle barrel adjacent its forward end, with a compression spring mounted longitudinally under said barrel, a securing band member extending about the barrel and arranged to resist the reaction of said spring at its forward end, and a wedging member slidably mounted on said band member, said wedging member being engaged by said spring and urged into wedging position, and having a forwardly extending wedging hook passing through an aperture in the stock, said wedging hook engaging in a part carried by a retainer plate located on the lower side of the stock, the wedging hook being reciprocable against the spring compression into position to be engaged by the part on said plate, the spring urging said hook forwardly to draw the barrel tightly to the stock, the said band member also supporting a cylinder closed at its rear end and engaging the lower side of the barrel and communicating with the barrel through a transverse aperture adjacent its lower end, said cylinder having a piston rod connected to said spring through a frame, whereby the gas passing through said aperture into said cylinder on the firing of a shot urges the piston forward to compress the spring a predetermined amount, said cylinder being provided with a side slot at a predetermined point between its ends so that the gas behind the piston is all released immediately through said slot, when the spring has been pressed a predetermined amount.

15. In a firearm, the combination of a stock, a barrel, a receiver, and a breech block movably mounted on the receiver, a main spring having a frame connected to the breech block, said frame extending forwardly and being connected to a piston located in a forwardly open cylinder, said cylinder communicating with the barrel at its closed rear and through a side aperture, said cylinder having its end portion slotted beyond a predetermined point, whereby the gas from the firing of a shot acts on said piston to move the piston forwardly with the frame to compress the main spring a predetermined amount for actuation of the breech block, all of the gas being released through said slotted part of the piston, when the spring has been compressed the predetermined amount, said piston comprising a plunger rod with a laterally turned end connected to the spring through said slot, whereby the head of the piston extends to a point adjacent said aperture, when the laterally turned end is at the base of said slot.

16. In a firearm, the combination of a stock, a barrel, a receiver, and a breech block movably mounted on the receiver, a main spring having a frame connected to the breech block, said frame extending forwardly and being connected to a piston located in a forwardly open cylinder, said cylinder communicating with the barrel at its closed rear and through a side aperture, said cylinder having its end portion slotted beyond a predetermined point, whereby the gas from the firing of a shot acts on said piston to move the piston forwardly with the frame to compress the main spring a predetermined amount for actuation of the breech block, all of the gas being released through said slotted part of the piston, when the spring has been compressed the predetermined amount, said cylinder being mounted in a metal member which surrounds said barrel, and also embraces said piston and holds it to the barrel, said spring frame being slidably mounted in said latter member by having legs guided in said metal member at each side of said cylinder.

17. In a firearm, the combination of a stock, a barrel, a receiver, and a breech block movably mounted on the receiver, a main spring having a frame connected to the breech block, said frame extending forwardly and being connected to a piston located in a forwardly open cylinder, said cylinder communicating with the barrel at its closed rear and through a side aperture, said cylinder having its end portion slotted beyond a predetermined point, whereby the gas from the firing of a shot acts on said piston to move the piston forwardly with the frame to compress the main spring a predetermined amount for actuation of the breech block, all of the gas being released through said slotted part of the piston, when the spring has been compressed the predetermined amount, said cylinder being mounted in a metal member which surrounds said barrel, and also embraces said piston and holds it to the barrel, said spring frame being slidably mounted in said latter member by having legs guided in said metal member at each side of said cylinder, said main spring having its forward end reacting against said metal member and urging forwardly a wedging hook for engaging a retaining plate and securing the barrel assembly to a stock.

18. In a barrel securing device for a firearm, a stock, a barrel pivotally mounted on the stock, in an open pivot socket, a link hooked on said stock, and hooked on said barrel, said link drawing the barrel back into its open socket pivot as the barrel pivots into position on the stock and locking as the pivots pass dead center.

HARRY W. HESTER.

References Cited in the file of this patent

UNITED STATES PATENTS

| Number | Name | Date |
| --- | --- | --- |
| 1,563,250 | Capon | Nov. 24, 1925 |
| 1,749,137 | Hudson | Mar. 4, 1930 |
| 2,052,287 | End | Aug. 25, 1936 |
| 2,364,549 | Pederson | Dec. 5, 1944 |
| 2,365,389 | Browning | Dec. 19, 1944 |
| 2,455,644 | Barnes | Dec. 7, 1948 |

FOREIGN PATENTS

| Number | Country | Date |
| --- | --- | --- |
| 605,728 | Germany | Nov. 17, 1934 |
| 839,799 | France | Jan. 7, 1939 |